(12) United States Patent
Hosoya

(10) Patent No.: US 7,462,422 B2
(45) Date of Patent: Dec. 9, 2008

(54) POSITIVE ELECTRODE ACTIVE MATERIAL AND NON-AQUEOUS ELECTROLYTE SECONDARY CELL

(75) Inventor: Yosuke Hosoya, Fukushima (JP)

(73) Assignee: Sony Corporation, Tokyo (JP)

(*) Notice: Subject to any disclaimer, the term of this patent is extended or adjusted under 35 U.S.C. 154(b) by 630 days.

(21) Appl. No.: 11/052,967

(22) Filed: Feb. 7, 2005

(65) Prior Publication Data

US 2005/0181279 A1    Aug. 18, 2005

(30) Foreign Application Priority Data

Feb. 16, 2004   (JP) ........................... P2004-038730

(51) Int. Cl.
*H01M 4/58* (2006.01)
(52) U.S. Cl. ................. 429/231.1; 429/223; 429/218.1; 429/246; 252/182.1
(58) Field of Classification Search ............... 429/231.1, 429/223, 218.1, 246; 252/182.1
See application file for complete search history.

(56) References Cited

U.S. PATENT DOCUMENTS

| 6,372,385 | B1 | 4/2002 | Kweon et al. |
| 6,881,520 | B1 * | 4/2005 | Li ........................... 429/231.1 |

FOREIGN PATENT DOCUMENTS

| JP | 05-283076 | 10/1993 |
| JP | 07-192721 | 7/1995 |
| JP | 07-235292 | 9/1995 |
| JP | 08-037007 | 2/1996 |
| JP | 8-102332 | 4/1996 |
| JP | 08-102332 | 4/1996 |
| JP | 8-222219 | 8/1996 |
| JP | 09-120815 | 5/1997 |
| JP | 10-302768 | 11/1998 |
| JP | 11-067209 | 3/1999 |
| JP | 11-317230 | 11/1999 |
| JP | 2000-58056 | 2/2000 |
| JP | 2000-77071 | 3/2000 |
| JP | 2000-149942 | 5/2000 |
| JP | 2000-149950 | 5/2000 |
| JP | 2005-515300 | 11/2000 |
| JP | 2001-035492 | 2/2001 |
| JP | 2001-243950 | 9/2001 |
| JP | 2001-297762 | 10/2001 |
| JP | 2002-008639 | 1/2002 |
| JP | 2002-063901 | 2/2002 |
| JP | 2002-324551 | 11/2002 |
| JP | 2003-173775 | 6/2003 |
| JP | 2003-242978 | 8/2003 |
| WO | 03/012901 | 2/2003 |

* cited by examiner

*Primary Examiner*—Laura S Weiner
(74) *Attorney, Agent, or Firm*—Bell, Boyd & Lloyd LLP

(57) ABSTRACT

A non-aqueous electrolyte secondary cell having superior high temperature-operation properties and excellent large current-discharge properties is provided. The non-aqueous electrolyte secondary cell has a positive electrode composed of a positive electrode collector and positive electrode active material layers formed thereon. A positive electrode active material contained in the above layer is formed of a first composite oxide and a second composite oxide mixed therewith. The first composite oxide is formed of grains of a first lithium transition metal composite oxide containing at least nickel as a transition metal and a cover layer formed on at least part of the surface of each of the grains for suppressing decomposition of an electrolyte caused by the first lithium transition metal composite oxide. The second composite oxide is composed of grains of a second lithium transition metal composite oxide.

14 Claims, 1 Drawing Sheet

FIGURE
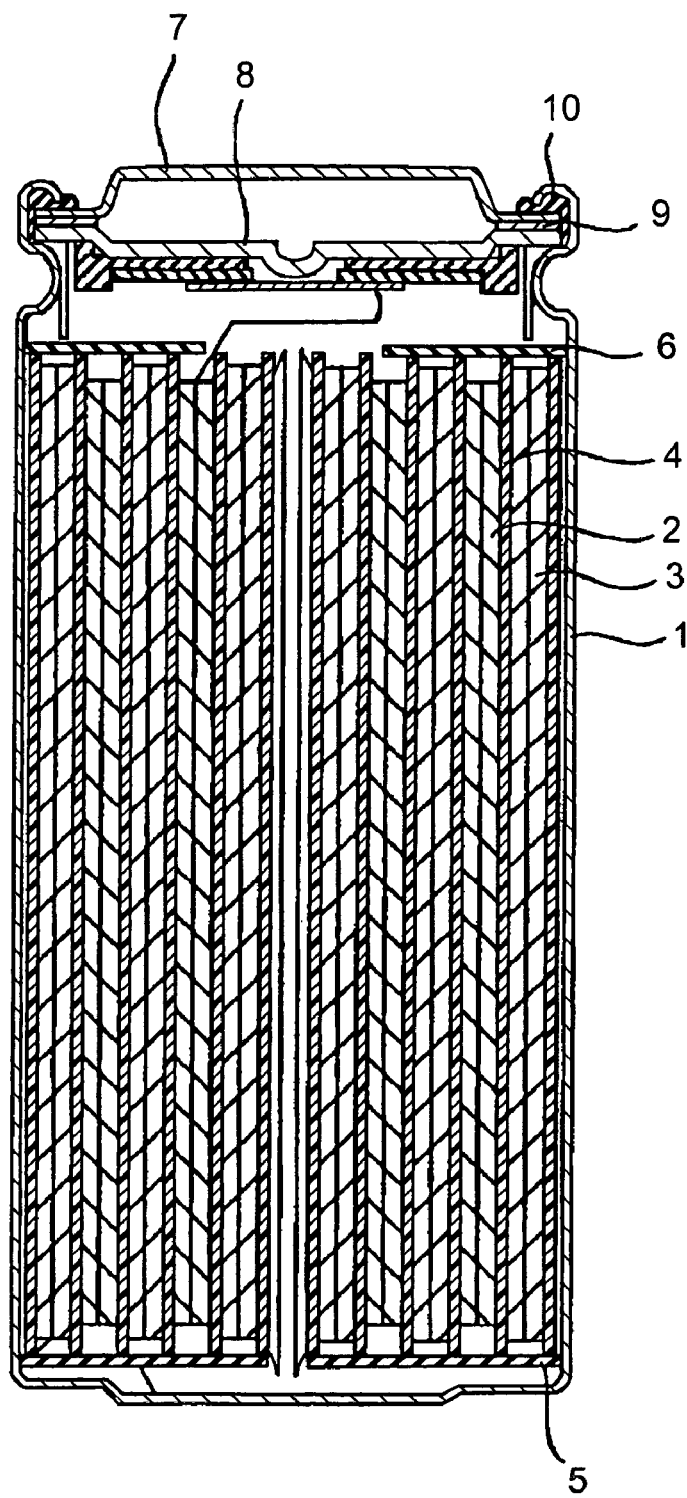

POSITIVE ELECTRODE ACTIVE MATERIAL AND NON-AQUEOUS ELECTROLYTE SECONDARY CELL

CROSS REFERENCE TO RELATED APPLICATIONS

The present application claims priority to Japanese Patent Document No. P2004-038730 filed on Feb. 16, 2004, the disclosure of which in its entirety is herein incorporated by reference.

BACKGROUND OF THE INVENTION

The present invention relates to a positive electrode active material containing lithium and nickel as primary components and a non-aqueous electrolyte secondary cell using the above positive electrode active material.

In recent year, various portable electronic devices, such as camcorders, mobile phones, and laptop computers, have been introduced to the market and have been increasingly in demand. Concomitant with the trend toward compact and light-weight electronic devices, research and development of cells, in particular, secondary cells, used as a portable electrical power source has been actively carried out in order to increase an energy density. Compared to related aqueous electrolytic solution secondary cells, such as a lead cell, a nickel-cadmium cell, and a nickel-hydrogen cell, since a lithium ion secondary cell has a high energy density, the demand thereof is large, and in addition, when environment resistance of this secondary cell is improved, expansion of the application thereof can be further expected. Furthermore, concomitant with the trend toward electronic devices having higher functionality, the power consumption tends to increase, and hence excellent performance of discharging a large current has also been required.

As positive electrode active materials used for a lithium ion cell, for example, a lithium cobalt composite oxide having a layered rock-salt structure, a lithium nickel composite oxide, and a lithium manganese composite oxide having a spinel structure have been practically used. Although individual oxides have their own particular features, since having well-balanced properties in view of capacity, cost, thermal stability, and the like, a lithium cobalt composite oxide has been widely used in recent years. A lithium manganese compound oxide has a low capacity and slightly inferior high-temperature storage properties. In addition, since having slightly inferior crystal structure stability and causing decomposition of an electrolyte by a side reaction, a lithium nickel compound oxide disadvantageously has inferior cycle properties and environmental resistance. However, in view of prices of starting materials and supply stability, the composite oxides described above are superior to a lithium cobalt compound oxide, and hence intensive research has been implemented focusing on future application and expansion.

As for a lithium nickel compound oxide, the following methods have been proposed in order to overcome the above problems. There may be mentioned a method (1) in which the cycle properties are improved by replacing part of nickel with another element (for example, see Japanese Unexamined Patent Application Publication Nos. 5-283076, 8-37007, and 2001-35492); a method (2) in which a particular metal salt or the like is added (for example, see Japanese Unexamined Patent Application Publication No. 7-192721); and a method (3) in which a binder in a positive electrode active material is defined (for example, see Japanese Unexamined Patent Application Publication No. 10-302768). However, according to research carried out by the inventor of the present invention, environmental resistance, in particular, properties under high temperature environment obtained by the methods (1) to (3) were not satisfactory.

In addition a method (4) has been proposed in which surfaces of grains of a positive electrode active material are covered with a conductive agent or another layered oxide (for example, see Japanese Unexamined Patent Application Publication Nos. 7-235292, 11-67209, and 2000-149950). However, according to the research carried out by the inventor of the present invention, it was confirmed that by the method (4) described above, the capacity is decreased, and discharge properties of discharging a large current are degraded. Hence, it is difficult to apply the method (4) described above to a cell which is required to have a large capacity and a large electricity.

Furthermore, a method (5) has been disclosed in which a metal or a metal oxide, which is unlikely to decompose an non-aqueous electrolyte, is dispersed and held on surfaces of grains of a positive electrode active material (for example, see Japanese Unexamined Patent Application Publication No. 8-102332). However, according to the research carried out by the inventor of the present invention, it was also confirmed that since the metal and the metal oxide dispersed on the surfaces have no lithium ion conductivity according to the method (5) described above, intercalation of lithium ions into a positive electrode active material and deintercalation therefrom are inhibited, and that discharge properties of discharging a large current are particularly degraded. In addition, the amount of the dispersed material disclosed in the method described above was not large enough to obtain the effect described above.

In addition, a method (6) has also been disclosed in which surface layers containing titanium are formed on grains of a positive electrode active material (for example, see Japanese Unexamined Patent Application Publication No. 2002-63901). However, according to the research carried out by the inventor of the present invention, by the method (6) described above, it was found that a sufficient effect of improving properties at high temperature operation cannot be obtained.

As described above, it has been difficult to simultaneously improve the properties (hereinafter referred to as "high temperature-operation properties) at high temperature operation and the discharge properties (hereinafter referred to as "large current-discharge properties) of discharging a large current. Hence, a non-aqueous electrolyte secondary cell has been desired which has both superior high temperature-operation properties and excellent large current-discharge properties.

SUMMARY OF THE INVENTION

The present invention relates to a positive electrode active material containing lithium and nickel as primary components and a non-aqueous electrolyte secondary cell using the above positive electrode active material.

The present invention provides in an embodiment a positive electrode active material and a non-aqueous electrolyte secondary cell using the same. The positive electrode active material displays both superior high temperature-operation properties and excellent large current-discharge properties.

In order to solve the problems of the related techniques described above, intensive research was implemented by the inventor of the present invention. Hereinafter, the research thus implemented will be described in detail.

According to knowledge of the inventor of the present invention, in a non-aqueous electrolyte secondary cell using a lithium transition metal composite oxide as a positive electrode active material, when a large current is successively discharged, due to a thermal loss inside the cell, a cell temperature is increased. By the increase in cell temperature, oxidation decomposition of the positive electrode active material is facilitated on the surface thereof, the electrical resistance is increased due to the formation of an oxide film or the like, and as a result, the large current-discharge properties are degraded. In addition, when a non-aqueous electrolyte secondary cell is operated under high temperature environment, since the electrical resistance is increased as is the above case in which a large current is discharged, the high temperature-operation properties are also degraded.

According to the knowledge of the inventor of the present invention, when cover layers are formed on surfaces of grains of a lithium transition metal composite oxide, the increase in electrical resistance can be suppressed when a large current is discharged and when high temperature operation is performed. The reasons for this are as follows. That is, when the cover layers are formed on the surfaces of grains of a lithium transition metal composite oxide, since direct contact between the lithium transition metal composite oxide and an electrolyte can be prevented, oxidation decomposition of the electrolyte can be suppressed, and as a result, the increase in electrical resistance caused by increase in temperature is unlikely to occur.

However, again according to the knowledge of the inventor of the present invention, when cover layers are formed on surfaces of grains of a lithium transition metal composite oxide, since a cell voltage is decreased at an initial discharge stage, a problem may arise in that excellent large current-discharge properties cannot be obtained. That is, by the formation of the cover layers, ionic conductivity and electronic conductivity are decreased, and as a result, the electrical resistance of the entire electrode is increased. Consequently, an internal electrical resistance of a cell is increased, and a discharge voltage to be generated when a large current is discharged is adversely influenced, and particularly at the initial discharge stage at which a heavy load is applied, a voltage measured outside is seriously decreased.

Hence, in order to improve both the high temperature-operation properties and the large current-discharge properties, intensive research was carried out by the inventor of the present invention through various experiments. As a result, the inventor of the present invention discovered the following. That is, it was understood that when lithium transition metal composite oxide grains are added to and are mixed with a positive electrode active material composed of lithium transition metal composite oxide grains coated with cover layers, insufficient ionic conductivity and electronic conductivity of the positive electrode active material caused by the formation of the cover layers can be compensated for, and that as a result, the large current-discharge properties can be improved.

The present invention was made based on the research described above.

To these ends, in accordance with an embodiment of the present invention, there is provided a positive electrode active material which includes a first composite oxide and a second composite oxide mixed therewith. The first composite oxide includes: grains of a first lithium transition metal composite oxide containing at least nickel (Ni) as a transition metal; and a cover layer formed on at least part of the surface of each of the grains for suppressing decomposition of an electrolyte caused by the first lithium transition metal composite oxide. In addition, the second composite oxide includes grains of a second lithium transition metal composite oxide.

In accordance with another embodiment of the present invention, there is provided a non-aqueous electrolyte secondary cell comprising an electrolyte and a positive electrode active material which contains a first composite oxide and a second composite oxide mixed therewith. The first composite oxide includes: grains of a first lithium transition metal composite oxide containing at least nickel as a transition metal; and a cover layer formed on at least part of the surface of each of the grains for suppressing decomposition of the electrolyte caused by the first lithium transition metal composite oxide, and the second composite oxide comprises grains of a second lithium transition metal composite oxide.

In an embodiment of the present invention, the transition metal preferably contains 50% or more of nickel on a molar basis, the ratio of the first composite oxide to the second composite oxide on a weight basis is preferably set in the range of 80:20 to 30:70, and in addition, the first composite oxide and the second composite oxide preferably form a mixture having an average grain diameter of 5 to 20 μm.

In an embodiment of the present invention, the cover layer typically contains an inorganic compound, the ratio of the first lithium transition metal composite oxide to the inorganic compound on a weight basis is preferably set in the range of 99:1 to 65:35, and the inorganic compound preferably contains at least lithium. In addition, in an embodiment of the present invention, the electrolyte is typically a non-aqueous electrolyte, a solid electrolyte, or a gel electrolyte.

In an embodiment of the present invention, as the inorganic compound contained in the cover layer, a composite oxide containing lithium and titanium (Ti) as primary components is preferably used. When a composite oxide primarily composed of lithium and titanium is used, adhesion of the cover layer can be significantly improved. The reason for this is estimated that nickel in the first lithium transition metal composite oxide and lithium and titanium contained in the inorganic compound are interacted with each other. In addition, when the composite oxide primarily composed of lithium and titanium is used as the inorganic compound, lithium ions are easily diffused in the cover layer, and hence lithium ion conductivity between the grains of the first lithium transition metal composite oxide and the electrolyte can be improved.

According to the present invention, the positive electrode active material is a mixture of the first and the second composite oxides. The first composite oxide is formed of the grains of the first lithium transition metal composite oxide containing at least nickel as a transition metal and the cover layers for suppressing decomposition of the electrolyte caused by the first lithium transition metal composite oxide. The second composite oxide is formed of the grains of the second lithium transition metal composite oxide. Accordingly, by the first composite oxide, the decomposition of the electrolyte caused by the first lithium transition metal composite oxide can be suppressed, and hence an increase in internal electrical resistance caused by heat generated when a large current is discharged and an increase in internal electrical resistance which occurs when high temperature operation is performed can be suppressed. In addition, by the presence of the second composite oxide, since decreases in ionic conductivity and electronic conductivity caused by the formation of the cover layers can be compensated for, hence a decrease in potential at the initial discharge stage can be suppressed.

As described above, according to an embodiment of the present invention, since the decomposition of the electrolyte caused by the first lithium transition metal composite oxide can be suppressed by the first composite oxide, the increase in internal electrical resistance caused by heat generated when a large current is discharged and the increase in internal electrical resistance which occurs when high temperature operation is performed can be suppressed. In addition, by the presence of the second composite oxide, since the decreases in ionic conductivity and electronic conductivity caused by the formation of the cover layers can be compensated for, the decrease in potential at the initial discharge stage can be suppressed. As a result, the high temperature-operation properties and the large current-discharge properties can both be improved.

According to an embodiment of the present invention, since the transition metal contains 50% or more of nickel on a molar basis, the high temperature-operation properties and the large current-discharge properties can both be further improved.

According to an embodiment of the present invention, since the ratio of the first composite oxide to the second composite oxide on a weight basis is set in the range of 80:20 to 30:70, the high temperature-operation properties and the large current-discharge properties can both be further improved.

According to an embodiment of the present invention, since the first composite oxide and the second composite oxide form a mixture having an average grain diameter of 5 to 20 μm, the high temperature-operation properties and the large current-discharge properties can both be further improved.

According to an embodiment of the present invention, since the ratio of the first lithium transition metal composite oxide to the inorganic compound on a weight basis is set in the range of 99:1 to 65:35, the high temperature-operation properties and the large current-discharge properties can both be further improved.

According to an embodiment of the present invention, since the cover layer formed of the inorganic material contains lithium, lithium ions can easily diffuse in the cover layer. Hence, the decrease in lithium ion conductivity between the grains of the first lithium transition metal composite oxide and the electrolyte can be suppressed. Consequently, the high temperature-operation properties and the large current-discharge properties can both be further improved.

Additional features and advantages of the present invention are described in, and will be apparent from, the following Detailed Description of the Invention and the figures.

BRIEF DESCRIPTION OF THE FIGURES

FIG. 1 is a cross-sectional view showing the structure of a non-aqueous electrolyte secondary cell according to an embodiment of the present invention.

DETAILED DESCRIPTION OF THE INVENTION

The present invention relates to a positive electrode active material containing lithium and nickel as primary components and a non-aqueous electrolyte secondary cell using the above positive electrode active material.

An embodiment of the present invention will be described below with reference to the figure. FIG. 1 is a cross-sectional view showing the structure of a non-aqueous electrolyte secondary cell according to the embodiment of the present invention. In this embodiment, the case will be described above in which the non-aqueous electrolyte secondary cell is a secondary cell using a non-aqueous electrolytic solution.

As shown in FIG. 1, this non-aqueous electrolyte secondary cell is a so-called cylinder type cell which is composed of a hollow cylindrical cell can 1 and a spiral type electrode body disposed therein. This spiral type electrode body is formed by repeatedly winding a laminate which is composed of a strip-shaped positive electrode 2 containing a positive electrode active material, a strip-shaped negative electrode 3 containing a negative electrode active material, and a separator 4 having ion permeability and interposed therebetween. The cell can 1 is formed, for example, of iron coated with a nickel plating film, one end of the cell can 1 is sealed, and the other end thereof is opened. In addition, inside the cell can 1, a pair of insulating plates 5 and 6 is provided at the top and the bottom ends of the spiral type electrode body.

A cell lid 7 is crimped to the open end of the cell can 1 with a sealing gasket 10 interposed therebetween, so that a safety valve 8 and a positive temperature coefficient (PTC) element 9 are fitted inside the cell lid 7, thereby sealing the inside of the cell can 1. The cell lid 7 is formed, for example, of the same material as that for the cell can 1. The safety valve 8 is electrically connected to the cell lid 7 via the PTC element 9 and is provided with a so-called current-breaking mechanism for breaking electrical connection between the cell lid 7 and the spiral type electrode body when internal short circuiting occurs or when an internal pressure of the cell reaches to a predetermined value or more by heat applied from the outside. When the temperature is increased, the PTC element 9 restricts a current by an increase in electrical resistance, thereby preventing abnormal heat generation caused by a large current. The sealing gasket 10 is formed, for example, of an insulating material, and the surface of the gasket is coated with asphalt.

<Positive Electrode 2>

The positive electrode 2 is formed of a strip-shaped positive electrode collector and positive electrode active material layers provided on two surfaces of this positive electrode collector. The positive electrode collector is a metal foil formed, for example, of aluminum (Al). The positive electrode active material layer is formed, for example, of a positive electrode active material, a conductive agent, and a binder.

As the binder, for example, poly(tetrafluoroethylene), poly(vinyliden fluoride) (PVdF), or polyethylene may be used. As the conductive agent, for example, powdered carbon such as graphite or carbon black may be used.

The positive electrode active material is formed by mixing a first and a second composite oxide. The first composite oxide is formed of grains of a first lithium transition metal composite oxide containing at least nickel as a transition metal and a cover layer formed on at least part of the surface of each of the grains for suppressing decomposition of an electrolyte caused by the first lithium transition metal composite oxide. The second composite oxide is composed of grains of a second lithium transition metal composite oxide.

The first lithium transition metal composite oxide is a material capable of intercalating and deintercalating lithium and is a lithium transition metal composite oxide primarily composed, for example, of lithium and a transition metal containing 50% or more of nickel on a molar basis. As this lithium transition metal composite oxide, for example, $LiNi_{(1-x)}M_xO_2$ (where $0 \leq x \leq 0.5$ holds, and element M indicates a metal element other than nickel) may be mentioned. As the element M, for example, there may be mentioned at least one transition metal element, such as iron (Fe), cobalt (Co), manganese (Mn), copper (Cu), zinc (Zn), chromium (Cr), vanadium (V), and titanium (Ti) or at least one element, such as aluminum (Al), tin (Sn), boron (B), gallium (Ga), magnesium (Mg), calcium (Ca), and strontium (Sr). In addition, as the first composite oxide, a known material may be used in which a part of the constituent element is replaced with a different element. When the content of nickel is less than 50% on a molar basis, the large current-discharge properties are extremely degraded when a cover layer made of an inorganic compound is formed on the grain surface.

The cover layer is formed, for example, of an inorganic compound. As the inorganic compound, known materials stably present in the positive electrode can be used. And as the inorganic compound, there may be mentioned lithium composite oxides which are known as having a covering effect and which are other than that used for the grains described above; conductive oxides; stable oxides such as aluminum oxide and magnesium oxide; various inorganic solid electrolytes; and inorganic salts such as sulfates and phosphates including $LiFePO_4$ and the like. Among those mentioned above, since transfer of lithium ions between the first lithium transition metal composite oxide forming the grains and the electrolyte is facilitated, and the decrease in lithium ion conductivity caused by the cover layer can be suppressed, an inorganic compound containing lithium is preferably used as the inorganic compound.

As the inorganic compound containing lithium, a composite oxide primarily composed of lithium and titanium is preferably used. In particular, a lithium composite oxide such as $Li_4Ti_5O_{12}$, $Li_2TiO_3$, or $Li_2Ti_3O_7$ may be used. This composite oxide may have a cubic system, a monoclinic system, an orthorhombic system, or the like, and in particular, an oxide having a cubic spinel structure is preferable. In addition, as the composite oxide, for example, a known material such as $Li_4Ti_{4.90}Mn_{0.10}O_{12}$ may be used in which a part of the constituent element is replaced with a different element. When the composite oxide includes no lithium, the lithium ion conductivity of the cover layer is extremely decreased, and when this composite oxide is used for a non-aqueous electrolyte secondary cell, the capacity and the cycle properties thereof are degraded.

In addition, as the material for forming the cover layer, a mixture of an inorganic compound and a carbon material may be used. As the carbon material, various carbon materials having electronic conductivity may be used, and for example, besides crystalline carbon such as graphite, known materials such as amorphous carbon and carbon fiber may also be used. When a carbon material is contained in the cover layer, the electronic conductivity between the first lithium transition metal composite oxide and the electrolyte can be improved.

The cover layer covers at least a part of the surface of the grain made of the first lithium transition metal composite oxide and preferably covers the entire surface thereof. When the entire surface of the grain is covered with the cover layer, various advantages can be obtained. That is, for example, decomposition of electrolyte in high-temperature cycling and decrease in capacity caused by an increase in internal electrical resistance can be more reliably suppressed, and a non-aqueous electrolyte secondary cell can also be obtained having more superior high temperature-operation properties and more excellent large current-discharge properties.

As described above, the second composite oxide is composed of grains of the second lithium transition metal composite oxide. As the second lithium transition metal composite oxide, a material known as a positive electrode active material such as a lithium cobalt composite oxide, a lithium nickel composite oxide, and a lithium manganese composite oxide may be used, and in particular, a material having a layered structure is preferably used.

When the weight of the first composite oxide and that of the second composite oxide are represented by A and B, respectively, the weight ratio A/B is preferably set in the range of from 80/20 to 30/70. When the weight B becomes large than that in the case of a weight ratio of 30/70, in particular, the effect of improving the high temperature-operation properties becomes inferior, and when the weight B becomes smaller than that in the case of a weight ratio of 80/20, in particular, the effect of improving the high temperature-operation properties becomes particularly inferior.

When the weight of the first lithium transition metal composite oxide and that of the inorganic compound are represented by C and D, respectively, the weight ratio C/D is preferably set in the range of from 99/1 to 65/35. When the weight D becomes large than that in the case of a weight ratio of 99/1, the high temperature-operation properties becomes inferior, and when the weight D becomes smaller than that in the case of a weight ratio of 65/35, the covering by the cover layer becomes excessive, and for example, the large current-discharge properties are disadvantageously degraded.

The average grain diameter (median diameter) of the positive electrode active material formed by mixing the first and the second composite oxides is preferably in the range of 5 to 20 μm. When the average diameter is less than 5 μm, since the specific surface area is excessively increased, the reactivity with the electrolyte becomes high, and as a result, degradation in cell properties occurs. When the average diameter is more than 20 μm, since the specific surface area is decreased, transfer resistance of lithium ions between the electrolyte and the positive electrode active material is increased, and as a result, degradation in cell properties also occurs in this case.

A method for synthesizing the first and the second lithium transition metal composite oxides is not particularly limited; however, for example, a method may be mentioned having a step of mixing carbonates containing lithium, nickel, and the like in accordance with a desired composition, followed by firing at a temperature of from 600 to 1,100° C. in an air or an oxygen atmosphere. In addition, as the synthetic method, for example, a method may also be used in which a lithium source such as lithium hydroxide is mixed with a composite hydroxide obtained by coprecipitation from an aqueous solution of an inorganic salt primarily composed of nickel, followed by firing in an air or an oxygen atmosphere. Furthermore, when the properties described above can be realized, any optional methods including various solid phase syntheses and hydrothermal syntheses may also be used. In addition, as starting materials, composite carbonates, organic acid salts, oxides, and the like may also be used.

A method for synthesizing the inorganic compound described above is also not particularly limited. A commercially available oxide or inorganic salt may be used as long as being stable in the positive electrode.

For manufacturing the first composite oxide, a method for covering the surface of the first lithium transition metal composite oxide with the inorganic compound is not particularly limited as long as being capable of realizing the adhesion therebetween at the weight ratio described above. For example, there may be mentioned a method in which after the first lithium transition metal composite oxide and the inorganic compound are mixed together or individual precursors thereof are mixed together, heat treatment is performed so that the inorganic compound is allowed to adhere onto the first lithium transition metal composite oxide; a method in which a mechanical stress is applied to both types of grains so that the powdered inorganic compound is compressed onto the surfaces the grains of the first lithium transition metal composite oxide to realize physical adhesion therebetween; or a method such as a typical sol-gel method in which the inorganic compound is precipitated on the first lithium transition metal composite oxide in accordance with a wet process, followed by heat treatment.

<Negative Electrode 3>

The negative electrode 3 is composed of a strip-shaped negative electrode collector and negative electrode active material layers formed on two surfaces of this negative electrode collector. The negative electrode collector is a metal foil made of copper or the like. The negative electrode active material layer is formed, for example, of a negative electrode active material, a conductive agent, and a binder.

As the binder, for example, poly(tetrafluoroethylene), poly (vinylidene fluoride) (PVdF), or polyethylene may be used. As the conductive agent, for example, powdered carbon such as graphite or carbon black may be used.

As the negative electrode active material, any material may be used as long as being capable of electrochemically doping and undoping lithium at a potential of 2.0 V or less with respect to metal lithium. For example, there may be mentioned carbonaceous materials such as nongraphitizable carbon, artificial graphite, natural graphite, pyrocarbons, cokes (pitch coke, needle coke, petroleum coke, and the like), graphites, vitreous carbons, fired organic high molecular compounds (phenol resins, furan resins, and the like carbonized by firing at an appropriate temperature), carbon fibers, activated carbon, and carbon black. In addition, a metal capable of forming an alloy with lithium, an alloy of the metal, and an intermetallic compound thereof may also be used. Furthermore, oxides, such as an iron oxide, ruthenium oxide, molybdenum oxide, tungsten oxide, titanium oxide, and tin oxide, which are capable of doping and undoping lithium at a relatively base potential, may also be used, and nitrides derived from the above oxides may also be used.

Methods for manufacturing the above negative electrode 3 and the positive electrode 2 are not particularly limited. For example, there may be mentioned a coating method for preparing a solvent solution containing an active material mixed with a known binder, conductive material, and the like, followed by coating of the solution; a method for heating a mixture containing an active material, a known binder, and the like, followed by coating of the mixture; and a method for forming a molded electrode, for example, by molding an active material itself or a mixture thereof containing a conductive material and/or a binder. However, the methods of the present invention are not limited thereto. In more particular, for example, after being formed by mixing an active material, a binder, an organic solvent, and the like, a slurry thus obtained is applied to a collector, followed by drying, thereby forming an electrode. Alternatively, regardless whether the binder is present or not, an electrode having strength can be formed when an active material is press-molded while being heated.

<Separator 4>

As the separator 4, for example, a polyolefin-base fine porous film made of polyethylene, polypropylene, or the like may be used.

<Electrolyte>

As the electrolyte, a non-aqueous electrolyte composed of an organic solvent (non-aqueous solvent) and an electrolyte salt dissolved therein may be used. The non-aqueous electrolyte is prepared by optional combination of an organic solvent and an electrolyte. As the organic solvent, any materials used for this type of cell may be used. In particular, as the organic solvents, for example, there may be mentioned methyl ethyl carbonate, propylene carbonate, ethylene carbonate, diethyl carbonate, dimethyl carbonate, 1,2-dimethoxyethane, 1,2-diethoxyethane, γ-butyrolactone, tetrahydrofuran, 2-methyltetrahydrofuran, 1,3-dioxolan, 4-methyl-1,3-dioxolan, diethyl ether, sulfolane (tetrahydrothiophene-1,1-dioxide), methyl sulfolane, acetonitrile, propionitrile, anisole, acetic ester, butyric ester, and propionic ester. In addition, the solvents mentioned above may be used alone or in combination.

As the electrolyte salt, any materials which are used for this type of cell may be used. For example, there may be mentioned $LiClO_4$, $LiAsF_6$, $LiPF_6$, $LiBF_4$, $LiB(C_6H_5)_4$, $LiCH_3SO_3$, $LiCF_3SO_3$, $LiCl$, and $LiBr$.

As a method for forming the cell, for example, a winding method for winding positive and negative electrodes around a core with the separator 4 provided therebetween or a lamination method for alternately laminating electrodes and the separators 4 may be mentioned. For example, the present invention may be applied to a square-shaped cell formed by the winding method.

According to the above embodiment of the present invention, the following effects may be obtained.

As described above, the positive electrode active material includes the first composite oxide and the second composite oxide mixed therewith. The first composite oxide includes grains of the first lithium transition metal composite oxide containing at lease nickel as a transition metal and the cover layer formed on at least part of the surface of each of the grains described above. In addition, the second composite oxide comprises grains of the second lithium transition metal composite oxide.

By the first composite oxide, the decomposition of the electrolyte, which occurs when high-temperature cycling is performed, can be suppressed, and the decrease in capacity caused by the increase in internal electrical resistance in high-temperature cycling can be suppressed. In addition, the decomposition of the electrolyte caused by heat generated when a large current is discharged can be suppressed, and the decrease in capacity can be suppressed which is caused by increase in internal electrical resistance due to large current discharge. Furthermore, by the presence of the second composite oxide, the decreases in ionic conductivity and electronic conductivity caused by the formation of the cover layers can be compensated for, and hence the decrease in cell voltage which occurs at an initial large-current discharge stage can be suppressed.

That is, since the decrease in cell voltage at the initial large current-discharge stage can be suppressed, and in addition, the decrease in capacity caused by heat generation due to large current discharge can be suppressed, the large current-discharge properties can be improved. In addition, since the decrease in capacity caused by heat generation in high-temperature cycling can be suppressed, the properties in high-temperature cycling can be improved.

In addition, when the weight ratio between the first and the second composite oxides is appropriately controlled, compared to adverse influence of oxidation decomposition progressing along the surfaces of the grains of the second composite oxide, which are not covered with the cover layers, the suppression of the increase in electrical resistance of the entire positive electrode by the first composite oxide covered with the cover layer has significantly effective influence on the cell properties. Hence, under high temperature environment, a low internal electrical resistance can be maintained. Accordingly, the properties in high-temperature cycling can be improved.

EXAMPLES

Hereinafter, the present invention will be described in detail with reference to examples; however, the present invention is not limited thereto. First, examples and comparative examples will be described which were performed for research on the mixing ratio between the first composite oxide and the second composite oxide and on the content of nickel of the first lithium transition metal composite oxide.

Example 1

First Lithium Transition Metal Composite Oxide

An aqueous solution containing Ni and Mn at molar ratios of 0.75 and 0.25, respectively, formed by using commercially available nickel nitrate and manganese nitrate was dripped to an aqueous ammonium solution while being sufficiently stirred, thereby forming a composite hydroxide. This composite hydroxide was mixed with lithium hydroxide and was fired at 850° C. for 10 hours under an oxygen flow, followed by pulverization, thereby forming a powdered lithium-nickel-manganese composite oxide which was the first lithium transition metal composite oxide.

In addition, when the first lithium transition metal composite oxide thus obtained was analyzed by atomic absorption spectrometry, a composition represented by $LiNi_{0.75}Mn_{0.25}O_2$ was identified. Furthermore, when the grain diameter was measured using a laser diffraction method, the average grain diameter was 12 μm. In addition, when X-ray diffraction measurement was performed for this powder, a pattern obtained thereby was similar to a pattern of $LiNiO_2$ of International Centre for Diffraction Data (ICDD) No. 09-0063, and the powder thus obtained was confirmed to have a layered rock-salt structure equivalent to that of $LiNiO_2$. When the powder described above was further analyzed using a scanning electron microscope (SEM), spherical aggregated grains each formed of primary particles having a diameter of 0.1 to 5 μm were observed.

Inorganic Compound

A commercially available anatase type titanium oxide and lithium hydroxide were mixed at a ratio Li/Ti of 4/5 on a weight basis and were then fired at 800° C. for 10 hours, followed by pulverization, thereby forming a powder lithium titanate composite compound which was the inorganic compound. In addition, when the grain diameter of the lithium titanate composite compound thus formed was measured by a laser diffraction method, the average diameter was 0.4 μm. Furthermore, when X-ray diffraction measurement was performed for this lithium titanate composite compound, a pattern obtained thereby was confirmed which corresponded to a pattern of $Li_4Ti_5O_{12}$ having a cubic spinel structure of ICDD No. 26-1198.

First Composite Oxide

When the weight of the first lithium transition metal composite oxide and that of the inorganic compound were represented by C and D, respectively, the first lithium transition metal composite oxide and the inorganic compound were mixed together so that a mixing ratio C/D of 90/10 was obtained. The mixed powder thus obtained was processed by grain-composition treatment using a mechanofusion apparatus (AMS-LAB) manufactured by Hosokawamicron Corporation, thereby forming the first composite oxide.

The mechanofusion apparatus is formed of a rotating cylindrical container and semi-cylindrical-shaped fixed bars, which were disposed along an internal wall of the container and parallel to a rotation axis thereof, and allows a mixed powder which is pressed onto the internal wall of the container by a centrifugal force to pass through spaces formed between the fixed bars and the internal wall of the container. Accordingly, a compressive and a share stress are applied to the mixed powder, so that one type of grains thereof are forcedly compressed and adhered to the surfaces of the other type of grains. In this example, the space between the fixed bar and the internal wall of the container was set to 5 mm, and the linear speed passing through this space was set to 20 m/minute, so that the inorganic compound was adhered onto the surfaces of the grains formed of the first lithium transition metal composite oxide. In addition, when the surface and the cross-section of the grain thus processed were observed using a SEM, on the spherical grain of the first lithium transition metal composite oxide, the formation of a layer was confirmed which had a thickness of 1 to 2 μm and which was composed of the grains of the inorganic compound.

Second Composite Oxide

An aqueous solution containing Ni, Co, and Mn at molar ratios of 0.40, 0.30, and 0.30, respectively, formed by mixing commercially available nickel nitrate, cobalt nitrate, and manganese nitrate was dripped to an ammonium aqueous solution while being sufficiently stirred, thereby forming a composite hydroxide. This composite hydroxide was mixed with lithium hydroxide and was fired at 900° C. for 10 hours under an air flow, followed by pulverization, thereby forming a powdered lithium-nickel-cobalt-manganese composite oxide (second lithium transition metal composite oxide) which was the second composite oxide.

In addition, when the second composite oxide thus obtained was analyzed by atomic absorption spectrometry, a composition represented by $LiNi_{0.40}Co_{0.30}Mn_{0.30}O_2$ was identified. Furthermore, when the grain diameter was measured using a laser diffraction method, the average grain diameter was 11 μm. In addition, when X-ray diffraction measurement was performed for this second composite oxide, a pattern obtained thereby was similar to a pattern of $LiNiO_2$ of ICDD No. 09-0063, and the powder thus obtained was confirmed to have a layered rock-salt structure equivalent to that of $LiNiO_2$. When the powder described above was further analyzed using a SEM, spherical aggregated grains each formed of primary particles having a diameter of 0.1 to 5 μm were observed.

Positive Electrode Active Material

When the weight of the first composite oxide and that of the second composite oxide were represented by A and B, respectively, the first and the second composite oxides were mixed together so that a mixing ratio A/B of 50/50 was obtained. The mixed powder thus obtained was stirred in a dry atmosphere to form a uniform mixture, thereby forming the positive electrode active material. Subsequently, when the grain diameter of this positive electrode active material was measure using a laser diffraction method, the average diameter was 12 μm.

Positive Electrode 2

Next, 86 percent by weight of the positive electrode active material thus obtained as described above, 10 percent by weight of graphite used as a conductive agent, and 4 percent by weight of polyvinylidene fluoride (PVdF) used as a binder were mixed together, and the mixture thus formed was dispersed in N-methyl-2-pyrrolidone (NMP), thereby forming a positive electrode-forming slurry. This slurry was uniformly applied onto two surfaces of a strip-shaped aluminum foil having a thickness of 20 μm, followed by drying, and was then compressed using a roller press machine, thereby forming the strip-shaped positive electrode 2.

Negative Electrode 3

Next, 90 percent by weight of powdered artificial graphite used as a negative electrode active material and 10 percent by weight of polyvinylidene fluoride (PVdF) used as a binder were mixed together, and the mixture thus formed was dispersed in NMP, thereby forming a negative electrode-forming slurry. This slurry was uniformly applied onto two surfaces of a strip-shaped copper foil having a thickness of 10 μm, followed by drying, and was then compressed using a roller press machine, thereby forming the strip-shaped negative electrode 3.

Cell Formation

The strip-shaped positive electrode 2 and the strip-shaped negative electrode 3 thus formed were wound a plurality of times with a porous polyolefin film used as the separator 4 interposed therebetween, so that a spiral type electrode body was formed. This electrode body was placed in the iron-made cell can 1 processed by nickel plating, and the insulating plates 5 and 6 were disposed on the top and the bottom surfaces of the electrode body. Subsequently, an aluminum-made positive electrode lead was extended from the positive electrode collector and was welded to a protruding portion of the safety valve 8 which was reliably electrically connected to the cell lid 7, and a nickel-made negative electrode lead was extended from the negative electrode collector and was welded to a bottom portion of the cell can 1.

Next, $LiPF_6$ was dissolved in a mixed solution of ethylene carbonate and methyl ethyl carbonate at a mixing ratio of 1/1 on a volume basis so that the content was 1 mol/dm$^3$, thereby preparing a non-aqueous electrolytic solution. Finally, after the non-aqueous electrolytic solution thus obtained was charged in the cell can 1 in which the above electrode body was placed, the cell lid 7 was crimped to the cell can 1 with the insulating sealing gasket 10 interposed therebetween so that the safety valve 8 was fitted in the cell lid 7, thereby forming a cylinder type cell having an exterior diameter of 18 mm and a height of 65 mm.

Evaluation of Properties

After being charged at an environmental temperature of 50° C., a charging voltage of 4.20 V, a charging current of 1.00 A, and a charging time of 2.5 hours, the non-aqueous electrolyte secondary cell (non-aqueous electrolytic solution secondary cell) thus obtained was discharged at a discharge current of 1.00 A until a final voltage of 2.50 V was obtained, so that the initial capacity was measured. In addition, charging and discharging were repeatedly performed in the same manner as the case described above, the discharge capacity was measured at the 100th cycle, so that a retention ratio thereof with respect to the initial capacity was obtained. In addition, after a cell formed in the same manner as that described above was charged at an environmental temperature of 23° C., a charging voltage of 4.20 V, a charging current of 1.00 A, and a charging time of 2.5 hours, the cell was discharged at a discharge current of 4.00 A until a final voltage of 2.50 V was obtained, and the capacity at large current discharge was measured, so that a retention ratio thereof with respect to the initial capacity was obtained.

Example 2

A non-aqueous electrolyte secondary cell was formed in the same manner as that in Example 1 except that the first composite oxide and the second compound oxide were mixed together so that a weight ratio A/B of 80/20 was obtained. Subsequently, as was the case in Example 1, the cycle retention ratio at 50° C. and the retention ratio at large current discharge were measured.

Example 3

A non-aqueous electrolyte secondary cell was formed in the same manner as that in Example 1 except that the first composite oxide and the second compound oxide were mixed together so that a weight ratio A/B of 30/70 was obtained. Subsequently, as was the case in Example 1, the cycle retention ratio at 50° C. and the retention ratio at large current discharge were measured.

Example 4

A non-aqueous electrolyte secondary cell was formed in the same manner as that in Example 1 except that in forming the inorganic compound, after lithium hydroxide and aluminum hydroxide were mixed together to have a ratio Li/Al of 50/50 and were then fired at 1,000° C., pulverization was performed to obtain $LiAlO_2$, and that this $LiAlO_2$ was used as the inorganic compound. Subsequently, as was the case in Example 1, the cycle retention ratio at 50° C. and the retention ratio at large current discharge were measured.

Example 5

A non-aqueous electrolyte secondary cell was formed in the same manner as that in Example 1 except that commercially available α-alumina ($Al_2O_3$) was used as the inorganic compound. Subsequently, as was the case in Example 1, the cycle retention ratio at 50° C. and the retention ratio at large current discharge were measured.

Example 6

A non-aqueous electrolyte secondary cell was formed in the same manner as that in Example 1 except that commercially available anatase type titanium oxide ($TiO_2$) was used as the inorganic compound. Subsequently, as was the case in Example 1, the cycle retention ratio at 50° C. and the retention ratio at large current discharge were measured.

Example 7

A non-aqueous electrolyte secondary cell was formed in the same manner as that in Example 1 except that commercially available magnesium oxide (MgO) was used as the inorganic compound. Subsequently, as was the case in Example 1, the cycle retention ratio at 50° C. and the retention ratio at large current discharge were measured.

Example 8

A non-aqueous electrolyte secondary cell was formed in the same manner as that in Example 1 except that in forming the first lithium transition metal composite oxide, $LiNi_{0.50}Co_{0.20}Mn_{0.30}O_2$ was obtained by addition of cobalt nitrate as a stating material and by changing the mixing ratio and the firing temperature. Subsequently, as was the case in Example 1, the cycle retention ratio at 50° C. and the retention ratio at large current discharge were measured.

Example 9

A non-aqueous electrolyte secondary cell was formed in the same manner as that in Example 1 except that in forming the first lithium transition metal composite oxide, the mixing ratio and the firing temperature were changed so as to obtain $LiNi_{0.80}Mn_{0.20}O_2$. Subsequently, as was the case in Example 1, the cycle retention ratio at 50° C. and the retention ratio at large current discharge were measured.

Example 10

A non-aqueous electrolyte secondary cell was formed in the same manner as that in Example 1 except that commercially available $LiCoO_2$ was used as the second lithium transition metal composite oxide. Subsequently, as was the case in Example 1, the cycle retention ratio at 50° C. and the retention ratio at large current discharge were measured.

Comparative Example 1

A non-aqueous electrolyte secondary cell was formed in the same manner as that in Example 1 except that $LiNi_{0.75}Mn_{0.25}O_2$, which was the first lithium transition metal composite oxide, was only used as the positive electrode active material. Subsequently, as was the case in Example 1, the cycle retention ratio at 50° C. and the retention ratio at large current discharge were measured.

Comparative Example 2

A non-aqueous electrolyte secondary cell was formed in the same manner as that in Example 1 except that $LiNi_{0.40}Co_{0.30}Mn_{0.30}O_2$, which was the second lithium transition metal composite oxide, was only used as the positive electrode active material. Subsequently, as was the case in Example 1, the cycle retention ratio at 50° C. and the retention ratio at large current discharge were measured.

Comparative Example 3

A non-aqueous electrolyte secondary cell was formed in the same manner as that in Comparative Example 2 except that commercially available $LiCoO_2$ was used as the second lithium transition metal composite oxide.

Subsequently, as was the case in Example 1, the cycle retention ratio at 50° C. and the retention ratio at large current discharge were measured.

Comparative Example 4

A non-aqueous electrolyte secondary cell was formed in the same manner as that in Comparative Example 2 except that commercially available $LiNiO_2$ was used as the second lithium transition metal composite oxide. Subsequently, as was the case in Example 1, the cycle retention ratio at 50° C. and the retention ratio at large current discharge were measured.

Comparative Example 5

A non-aqueous electrolyte secondary cell was formed in the same manner as that in Example 1 except that the first composite oxide was only used as the positive electrode active material. Subsequently, as was the case in Example 1, the cycle retention ratio at 50° C. and the retention ratio at large current discharge were measured.

Comparative Example 6

A non-aqueous electrolyte secondary cell was formed in the same manner as that in Example 1 except that $LiNi_{0.40}Co_{0.30}Mn_{0.30}O_2$, which was equivalent to the second lithium transition metal composite oxide, was used as the first lithium transition metal composite oxide. Subsequently, as was the case in Example 1, the cycle retention ratio at 50° C. and the retention ratio at large current discharge were measured.

Comparative Example 7

A non-aqueous electrolyte secondary cell was formed in the same manner as that in Example 1 except that the first composite oxide and the second composite oxide were mixed to have a ratio A/B of 90/10 on a weight basis. Subsequently, as was the case in Example 1, the cycle retention ratio at 50° C. and the retention ratio at large current discharge were measured.

Comparative Example 8

A non-aqueous electrolyte secondary cell was formed in the same manner as that in Example 1 except that the first composite oxide and the second composite oxide were mixed to have a ratio A/B of 20/80 on a weight basis. Subsequently, as was the case in Example 1, the cycle retention ratio at 50° C. and the retention ratio at large current discharge were measured.

Table 1 shows the structures and the evaluation results of the non-aqueous electrolyte secondary cells according to Examples 1 to 10 and Comparative Examples 1 to 8.

TABLE 1

| | First Lithium Transition Metal Composite Oxide | Inorganic Compound | Second Lithium Transition Metal Composite Oxide | Weight Ratio A:B | Capacity Retention Ratio at 50° C. (%) | Capacity Retention Ratio at Large Current Discharge (%) |
|---|---|---|---|---|---|---|
| Example 1 | $LiNi_{0.75}Mn_{0.25}O_2$ | $Li_4Ti_5O_{12}$ | $LiNi_{0.40}Co_{0.30}Mn_{0.30}O_2$ | 50:50 | 90.1 | 85.1 |
| Example 2 | $LiNi_{0.75}Mn_{0.25}O_2$ | $Li_4Ti_5O_{12}$ | $LiNi_{0.40}Co_{0.30}Mn_{0.30}O_2$ | 80:20 | 88.2 | 87.7 |
| Example 3 | $LiNi_{0.75}Mn_{0.25}O_2$ | $Li_4Ti_5O_{12}$ | $LiNi_{0.40}Co_{0.30}Mn_{0.30}O_2$ | 30:70 | 92.2 | 83.9 |
| Example 4 | $LiNi_{0.75}Mn_{0.25}O_2$ | $LiAlO_2$ | $LiNi_{0.40}Co_{0.30}Mn_{0.30}O_2$ | 50:50 | 86.8 | 84.4 |
| Example 5 | $LiNi_{0.75}Mn_{0.25}O_2$ | $Al_2O_3$ | $LiNi_{0.40}Co_{0.30}Mn_{0.30}O_2$ | 50:50 | 82.3 | 82.0 |
| Example 6 | $LiNi_{0.75}Mn_{0.25}O_2$ | $TiO_2$ | $LiNi_{0.40}Co_{0.30}Mn_{0.30}O_2$ | 50:50 | 82.7 | 82.1 |
| Example 7 | $LiNi_{0.75}Mn_{0.25}O_2$ | MgO | $LiNi_{0.40}Co_{0.30}Mn_{0.30}O_2$ | 50:50 | 83.6 | 81.4 |
| Example 8 | $LiNi_{0.50}Co_{0.20}Mn_{0.30}O_2$ | $Li_4Ti_5O_{12}$ | $LiNi_{0.40}Co_{0.30}Mn_{0.30}O_2$ | 50:50 | 89.7 | 84.5 |
| Example 9 | $LiNi_{0.80}Mn_{0.20}O_2$ | $Li_4Ti_5O_{12}$ | $LiNi_{0.40}Co_{0.30}Mn_{0.30}O_2$ | 50:50 | 88.8 | 86.2 |
| Example 10 | $LiNi_{0.75}Mn_{0.25}O_2$ | $Li_4Ti_5O_{12}$ | $LiCoO_2$ | 50:50 | 89.6 | 84.5 |
| Comparative Example 1 | $LiNi_{0.75}Mn_{0.25}O_2$ | — | — | 100:0 | 61.0 | 82.2 |

TABLE 1-continued

|  | First Lithium Transition Metal Composite Oxide | Inorganic Compound | Second Lithium Transition Metal Composite Oxide | Weight Ratio A:B | Capacity Retention Ratio at 50° C. (%) | Capacity Retention Ratio at Large Current Discharge (%) |
|---|---|---|---|---|---|---|
| Comparative Example 2 | — | — | $LiNi_{0.40}Co_{0.30}Mn_{0.30}O_2$ | 0:100 | 66.4 | 84.0 |
| Comparative Example 3 | — | — | $LiCoO_2$ | 0:100 | 43.2 | 83.0 |
| Comparative Example 4 | — | — | $LiNiO_2$ | 0:100 | 32.4 | 84.3 |
| Comparative Example 5 | $LiNi_{0.75}Mn_{0.25}O_2$ | $Li_4Ti_5O_{12}$ | — | 100:0 | 92.4 | 65.5 |
| Comparative Example 6 | $LiNi_{0.40}Co_{0.30}Mn_{0.30}O_2$ | $Li_4Ti_5O_{12}$ | $LiNi_{0.40}Co_{0.30}Mn_{0.30}O_2$ | 50:50 | 89.1 | 69.8 |
| Comparative Example 7 | $LiNi_{0.75}Mn_{0.25}O_2$ | $Li_4Ti_5O_{12}$ | $LiNi_{0.40}Co_{0.30}Mn_{0.30}O_2$ | 90:10 | 68.3 | 84.0 |
| Comparative Example 8 | $LiNi_{0.75}Mn_{0.25}O_2$ | $Li_4Ti_5O_{12}$ | $LiNi_{0.40}Co_{0.30}Mn_{0.30}O_2$ | 20:80 | 67.6 | 82.8 |

The following can be understood from Table 1.

(1) When the first composite oxide and the second composite oxide are mixed so that the ratio A/B was in the range of 80/20 to 30/70, the cycle capacity retention ratio at a high temperature of 50° C. and the capacity retention ratio at large current discharge can be made 82.3% or more and 81.4% or more, respectively.

(2) As can be seen from the result of Examples 1 and the results of Examples 4 to 7, compared to the case of $LiAlO_2$, $Al_2O_3$, $TiO_2$, or MgO used as the inorganic compound, by the use of $Li_4Ti_5O_{12}$ as the inorganic compound, the cycle capacity retention ratio at a high temperature of 50° C. and the capacity retention ratio at large current discharge can be improved. That is, as the inorganic compound forming the cover layer, a composite oxide containing Li and Ti is preferably used.

(3) As can be seen from the results of Examples 1, 8, and 9 and Comparative Example 6, which have the same weight ratio, when the molar ratio of nickel of the transition metals in the first lithium transition metal composite oxide is set to 50% or more, the cycle capacity retention ratio at a high temperature of 50° C. and the capacity retention ratio at large current discharge can both be improved.

(4) As can be seen from the results of Examples 1, 8, and 9 and Comparative Example 6, which have the same weight ratio, when the molar ratio of nickel of the transition metals in the first lithium transition metal composite oxide is set to 50% or more, the capacity retention ratio at large current discharge can be significantly improved.

(5) When the first and the second composite oxides are mixed at an appropriate weight ratio A/B, a decrease in potential at the initial discharge and degradation caused by heat generated when discharge occurs can be suppressed, and as a result, heavy loading properties can be improved. In addition, when the first and the second composite oxides are mixed at an appropriate weight ratio A/B, compared to adverse influence of electrolyte decomposition caused by the second composite oxide, the suppression of the increase in electrical resistance of the entire positive electrode has significantly effective influence on the cell properties, and as a result, the properties in high-temperature cycling can be improved. In order to obtain the effect described above, the weight ratio A/B is preferably set in the range of 80/20 to 30/70.

Among the results of the examples and the comparative examples shown in Table 1, results obtained under the same manufacturing conditions except for the weight ratio A/B are shown in Table 2.

TABLE 2

|  | First Lithium Transition Metal Composite Oxide | Inorganic Compound | Second Lithium Transition Metal Composite Oxide | Weight Ratio A:B | Capacity Retention Ratio at 50° C. (%) | Capacity Retention Ratio at Large Current Discharge (%) |
|---|---|---|---|---|---|---|
| Example 1 | $LiNi_{0.75}Mn_{0.25}O_2$ | $Li_4Ti_5O_{12}$ | $LiNi_{0.40}Co_{0.30}Mn_{0.30}O_2$ | 50:50 | 90.1 | 85.1 |
| Example 2 | $LiNi_{0.75}Mn_{0.25}O_2$ | $Li_4Ti_5O_{12}$ | $LiNi_{0.40}Co_{0.30}Mn_{0.30}O_2$ | 80:20 | 88.2 | 87.7 |
| Example 3 | $LiNi_{0.75}Mn_{0.25}O_2$ | $Li_4Ti_5O_{12}$ | $LiNi_{0.40}Co_{0.30}Mn_{0.30}O_2$ | 30:70 | 92.2 | 83.9 |
| Comparative Example 7 | $LiNi_{0.75}Mn_{0.25}O_2$ | $Li_4Ti_5O_{12}$ | $LiNi_{0.40}Co_{0.30}Mn_{0.30}O_2$ | 90:10 | 68.3 | 84.0 |
| Comparative Example 8 | $LiNi_{0.75}Mn_{0.25}O_2$ | $Li_4Ti_5O_{12}$ | $LiNi_{0.40}Co_{0.30}Mn_{0.30}O_2$ | 20:80 | 67.6 | 82.8 |

The following can be understood from Table 2. That is, when the ratio of the weight A is increased as compared to that of a weight ratio of 80/20, the cycle capacity retention ratio at 50° C. is extremely decreased. In addition, as is the case described above, when the ratio of the weight A is decreased as compared to that of a weight ratio of 30/70, the cycle capacity retention ratio at 50° C. is extremely decreased. That is, when the weight ratio A/B is controlled in the range of 80/20 to 30/70, the cycle capacity retention ratio at 50° C. can be significantly improved.

Next, examples and comparative examples will be described which were performed for research on the mixing ratio between the first lithium transition metal composite oxide and the inorganic compound forming the cover layer.

Example 11

The first composite oxide was obtained in the same manner as that in Example 1 except that the weight ratio C/D between the first lithium transition metal composite oxide and the inorganic compound forming the cover layer was set to 99/1. Subsequently, a non-aqueous electrolyte secondary cell was formed in the same manner as that in Example 1 except that described above. Next, as was the case in Example 1, the cycle retention ratio at 50° C. and the retention ratio at large current discharge were measured.

Example 12

The first composite oxide was obtained in the same manner as that in Example 5 except that the weight ratio C/D between the first lithium transition metal composite oxide and the inorganic compound forming the cover layer was set to 99/1. Subsequently, a non-aqueous electrolyte secondary cell was formed in the same manner as that in Example 1 except that described above. Next, as was the case in Example 1, the cycle retention ratio at 50° C. and the retention ratio at large current discharge were measured.

Example 13

The first composite oxide was obtained in the same manner as that in Example 8 except that the weight ratio C/D between the first lithium transition metal composite oxide and the inorganic compound forming the cover layer was set to 99/1. Subsequently, a non-aqueous electrolyte secondary cell was formed in the same manner as that in Example 1 except that described above. Next, as was the case in Example 1, the cycle retention ratio at 50° C. and the retention ratio at large current discharge were measured.

Example 14

The first composite oxide was obtained in the same manner as that in Example 9 except that the weight ratio C/D between the first lithium transition metal composite oxide and the inorganic compound forming the cover layer was set to 99/1. Subsequently, a non-aqueous electrolyte secondary cell was formed in the same manner as that in Example 1 except that described above. Next, as was the case in Example 1, the cycle retention ratio at 50° C. and the retention ratio at large current discharge were measured.

Example 15

The first composite oxide was obtained in the same manner as that in Example 10 except that the weight ratio C/D between the first lithium transition metal composite oxide and the inorganic compound forming the cover layer was set to 99/1. Subsequently, a non-aqueous electrolyte secondary cell was formed in the same manner as that in Example 1 except that described above. Next, as was the case in Example 1, the cycle retention ratio at 50° C. and the retention ratio at large current discharge were measured.

Example 16

The first composite oxide was obtained in the same manner as that in Example 1 except that the weight ratio C/D between the first lithium transition metal composite oxide and the inorganic compound forming the cover layer was set to 80/20. Subsequently, a non-aqueous electrolyte secondary cell was formed in the same manner as that in Example 1 except that described above. Next, as was the case in Example 1, the cycle retention ratio at 50° C. and the retention ratio at large current discharge were measured.

Example 17

The first composite oxide was obtained in the same manner as that in Example 5 except that the weight ratio C/D between the first lithium transition metal composite oxide and the inorganic compound forming the cover layer was set to 80/20. Subsequently, a non-aqueous electrolyte secondary cell was formed in the same manner as that in Example 1 except that described above. Next, as was the case in Example 1, the cycle retention ratio at 50° C. and the retention ratio at large current discharge were measured.

Example 18

The first composite oxide was obtained in the same manner as that in Example 8 except that the weight ratio C/D between the first lithium transition metal composite oxide and the inorganic compound forming the cover layer was set to 80/20. Subsequently, a non-aqueous electrolyte secondary cell was formed in the same manner as that in Example 1 except that described above. Next, as was the case in Example 1, the cycle retention ratio at 50° C. and the retention ratio at large current discharge were measured.

Example 19

The first composite oxide was obtained in the same manner as that in Example 9 except that the weight ratio C/D between the first lithium transition metal composite oxide and the inorganic compound forming the cover layer was set to 80/20. Subsequently, a non-aqueous electrolyte secondary cell was formed in the same manner as that in Example 1 except that described above. Next, as was the case in Example 1, the cycle retention ratio at 50° C. and the retention ratio at large current discharge were measured.

Example 20

The first composite oxide was obtained in the same manner as that in Example 10 except that the weight ratio C/D between the first lithium transition metal composite oxide and the inorganic compound forming the cover layer was set to 80/20. Subsequently, a non-aqueous electrolyte secondary cell was formed in the same manner as that in Example 1 except that described above. Next, as was the case in Example 1, the cycle retention ratio at 50° C. and the retention ratio at large current discharge were measured.

Example 21

The first composite oxide was obtained in the same manner as that in Example 1 except that the weight ratio C/D between the first lithium transition metal composite oxide and the inorganic compound forming the cover layer was set to 65/35. Subsequently, a non-aqueous electrolyte secondary cell was formed in the same manner as that in Example 1 except that described above. Next, as was the case in Example 1, the cycle retention ratio at 50° C. and the retention ratio at large current discharge were measured.

Example 22

The first composite oxide was obtained in the same manner as that in Example 5 except that the weight ratio C/D between the first lithium transition metal composite oxide and the inorganic compound forming the cover layer was set to 65/35. Subsequently, a non-aqueous electrolyte secondary cell was formed in the same manner as that in Example 1 except that described above. Next, as was the case in Example 1, the cycle retention ratio at 50° C. and the retention ratio at large current discharge were measured.

Example 23

The first composite oxide was obtained in the same manner as that in Example 8 except that the weight ratio C/D between the first lithium transition metal composite oxide and the inorganic compound forming the cover layer was set to 65/35. Subsequently, a non-aqueous electrolyte secondary cell was formed in the same manner as that in Example 1 except that described above. Next, as was the case in Example 1, the cycle retention ratio at 50° C. and the retention ratio at large current discharge were measured.

Example 24

The first composite oxide was obtained in the same manner as that in Example 9 except that the weight ratio C/D between the first lithium transition metal composite oxide and the inorganic compound forming the cover layer was set to 65/35. Subsequently, a non-aqueous electrolyte secondary cell was formed in the same manner as that in Example 1 except that described above. Next, as was the case in Example 1, the cycle retention ratio at 50° C. and the retention ratio at large current discharge were measured.

Example 25

The first composite oxide was obtained in the same manner as that in Example 10 except that the weight ratio C/D between the first lithium transition metal composite oxide and the inorganic compound forming the cover layer was set to 65/35. Subsequently, a non-aqueous electrolyte secondary cell was formed in the same manner as that in Example 1 except that described above. Next, as was the case in Example 1, the cycle retention ratio at 50° C. and the retention ratio at large current discharge were measured.

Comparative Example 9

The first composite oxide was obtained in the same manner as that in Example 1 except that the weight ratio C/D between the first lithium transition metal composite oxide and the inorganic compound forming the cover layer was set to 99.5/0.5. Subsequently, a non-aqueous electrolyte secondary cell was formed in the same manner as that in Example 1 except that described above. Next, as was the case in Example 1, the cycle retention ratio at 50° C. and the retention ratio at large current discharge were measured.

Comparative Example 10

The first composite oxide was obtained in the same manner as that in Example 5 except that the weight ratio C/D between the first lithium transition metal composite oxide and the inorganic compound forming the cover layer was set to 99.5/0.5. Subsequently, a non-aqueous electrolyte secondary cell was formed in the same manner as that in Example 1 except that described above. Next, as was the case in Example 1, the cycle retention ratio at 50° C. and the retention ratio at large current discharge were measured.

Comparative Example 11

The first composite oxide was obtained in the same manner as that in Example 8 except that the weight ratio C/D between the first lithium transition metal composite oxide and the inorganic compound forming the cover layer was set to 99.5/0.5. Subsequently, a non-aqueous electrolyte secondary cell was formed in the same manner as that in Example 1 except that described above. Next, as was the case in Example 1, the cycle retention ratio at 50° C. and the retention ratio at large current discharge were measured.

Comparative Example 12

The first composite oxide was obtained in the same manner as that in Example 9 except that the weight ratio C/D between the first lithium transition metal composite oxide and the inorganic compound forming the cover layer was set to 99.5/0.5. Subsequently, a non-aqueous electrolyte secondary cell was formed in the same manner as that in Example 1 except that described above. Next, as was the case in Example 1, the cycle retention ratio at 50° C. and the retention ratio at large current discharge were measured.

Comparative Example 13

The first composite oxide was obtained in the same manner as that in Example 10 except that the weight ratio C/D between the first lithium transition metal composite oxide and the inorganic compound forming the cover layer was set to 99.5/0.5. Subsequently, a non-aqueous electrolyte secondary cell was formed in the same manner as that in Example 1 except that described above. Next, as was the case in Example 1, the cycle retention ratio at 50° C. and the retention ratio at large current discharge were measured.

Comparative Example 14

The first composite oxide was obtained in the same manner as that in Example 1 except that the weight ratio C/D between the first lithium transition metal composite oxide and the inorganic compound forming the cover layer was set to 60/40. Subsequently, a non-aqueous electrolyte secondary cell was formed in the same manner as that in Example 1 except that described above. Next, as was the case in Example 1, the cycle retention ratio at 50° C. and the retention ratio at large current discharge were measured.

Comparative Example 15

The first composite oxide was obtained in the same manner as that in Example 5 except that the weight ratio C/D between the first lithium transition metal composite oxide and the inorganic compound forming the cover layer was set to 60/40. Subsequently, a non-aqueous electrolyte secondary cell was formed in the same manner as that in Example 1 except that described above. Next, as was the case in Example 1, the cycle retention ratio at 50° C. and the retention ratio at large current discharge were measured.

Comparative Example 16

The first composite oxide was obtained in the same manner as that in Example 8 except that the weight ratio C/D between the first lithium transition metal composite oxide and the inorganic compound forming the cover layer was set to 60/40. Subsequently, a non-aqueous electrolyte secondary cell was formed in the same manner as that in Example 1 except that described above. Next, as was the case in Example 1, the cycle retention ratio at 50° C. and the retention ratio at large current discharge were measured.

Comparative Example 17

The first composite oxide was obtained in the same manner as that in Example 9 except that the weight ratio C/D between the first lithium transition metal composite oxide and the inorganic compound forming the cover layer was set to 60/40. Subsequently, a non-aqueous electrolyte secondary cell was formed in the same manner as that in Example 1 except that described above. Next, as was the case in Example 1, the cycle retention ratio at 50° C. and the retention ratio at large current discharge were measured.

Comparative Example 18

The first composite oxide was obtained in the same manner as that in Example 10 except that the weight ratio C/D between the first lithium transition metal composite oxide and the inorganic compound forming the cover layer was set to 60/40. Subsequently, a non-aqueous electrolyte secondary cell was formed in the same manner as that in Example 1 except that described above. Next, as was the case in Example 1, the cycle retention ratio at 50° C. and the retention ratio at large current discharge were measured.

Table 3 shows the structures and the evaluation results of the non-aqueous electrolyte secondary cells according to Examples 11 to 25 and Comparative Examples 9 to 18.

TABLE 3

| | First Lithium Transition Metal Composite Oxide | Inorganic Compound | Weight Ratio C:D | Second Lithium Transition Metal Composite Oxide | Capacity Retention Ratio at 50° C. (%) | Capacity Retention Ratio at Large Current Discharge (%) |
|---|---|---|---|---|---|---|
| Example 1 | $LiNi_{0.75}Mn_{0.25}O_2$ | $Li_4Ti_5O_{12}$ | 90:10 | $LiNi_{0.40}Co_{0.30}Mn_{0.30}O_2$ | 90.1 | 85.1 |
| Example 11 | $LiNi_{0.75}Mn_{0.25}O_2$ | $Li_4Ti_5O_{12}$ | 99:1 | $LiNi_{0.40}Co_{0.30}Mn_{0.30}O_2$ | 83.5 | 84.3 |
| Example 12 | $LiNi_{0.75}Mn_{0.25}O_2$ | $Al_2O_3$ | 99:1 | $LiNi_{0.40}Co_{0.30}Mn_{0.30}O_2$ | 79.0 | 82.0 |
| Example 13 | $LiNi_{0.50}Co_{0.20}Mn_{0.30}O_2$ | $Li_4Ti_5O_{12}$ | 99:1 | $LiNi_{0.40}Co_{0.30}Mn_{0.30}O_2$ | 89.7 | 84.4 |
| Example 14 | $LiNi_{0.80}Mn_{0.20}O_2$ | $Li_4Ti_5O_{12}$ | 99:1 | $LiNi_{0.40}Co_{0.30}Mn_{0.30}O_2$ | 82.3 | 85.4 |
| Example 15 | $LiNi_{0.75}Mn_{0.25}O_2$ | $Li_4Ti_5O_{12}$ | 99:1 | $LiCoO_2$ | 82.9 | 81.3 |
| Example 16 | $LiNi_{0.75}Mn_{0.25}O_2$ | $Li_4Ti_5O_{12}$ | 80:20 | $LiNi_{0.40}Co_{0.30}Mn_{0.30}O_2$ | 91.3 | 82.0 |
| Example 17 | $LiNi_{0.75}Mn_{0.25}O_2$ | $Al_2O_3$ | 80:20 | $LiNi_{0.40}Co_{0.30}Mn_{0.30}O_2$ | 83.3 | 79.2 |
| Example 18 | $LiNi_{0.50}Co_{0.20}Mn_{0.30}O_2$ | $Li_4Ti_5O_{12}$ | 80:20 | $LiNi_{0.40}Co_{0.30}Mn_{0.30}O_2$ | 90.9 | 81.6 |
| Example 19 | $LiNi_{0.80}Mn_{0.20}O_2$ | $Li_4Ti_5O_{12}$ | 80:20 | $LiNi_{0.40}Co_{0.30}Mn_{0.30}O_2$ | 90.0 | 83.1 |
| Example 20 | $LiNi_{0.75}Mn_{0.25}O_2$ | $Li_4Ti_5O_{12}$ | 80:20 | $LiCoO_2$ | 90.5 | 81.4 |
| Example 21 | $LiNi_{0.75}Mn_{0.25}O_2$ | $Li_4Ti_5O_{12}$ | 65:35 | $LiNi_{0.40}Co_{0.30}Mn_{0.30}O_2$ | 91.5 | 80.6 |
| Example 22 | $LiNi_{0.75}Mn_{0.25}O_2$ | $Al_2O_3$ | 65:35 | $LiNi_{0.40}Co_{0.30}Mn_{0.30}O_2$ | 84.4 | 77.7 |
| Example 23 | $LiNi_{0.50}Co_{0.20}Mn_{0.30}O_2$ | $Li_4Ti_5O_{12}$ | 65:35 | $LiNi_{0.40}Co_{0.30}Mn_{0.30}O_2$ | 91.0 | 80.5 |
| Example 24 | $LiNi_{0.80}Mn_{0.20}O_2$ | $Li_4Ti_5O_{12}$ | 65:35 | $LiNi_{0.40}Co_{0.30}Mn_{0.30}O_2$ | 90.2 | 81.6 |
| Example 25 | $LiNi_{0.75}Mn_{0.25}O_2$ | $Li_4Ti_5O_{12}$ | 65:35 | $LiCoO_2$ | 90.9 | 80.4 |
| Comparative Example 9 | $LiNi_{0.75}Mn_{0.25}O_2$ | $Li_4Ti_5O_{12}$ | 99.5:0.5 | $LiNi_{0.40}Co_{0.30}Mn_{0.30}O_2$ | 69.0 | 84.0 |
| Comparative Example 10 | $LiNi_{0.75}Mn_{0.25}O_2$ | $Al_2O_3$ | 99.5:0.5 | $LiNi_{0.40}Co_{0.30}Mn_{0.30}O_2$ | 63.2 | 81.3 |
| Comparative Example 11 | $LiNi_{0.50}Co_{0.20}Mn_{0.30}O_2$ | $Li_4Ti_5O_{12}$ | 99.5:0.5 | $LiNi_{0.40}Co_{0.30}Mn_{0.30}O_2$ | 67.7 | 82.4 |
| Comparative Example 12 | $LiNi_{0.80}Mn_{0.20}O_2$ | $Li_4Ti_5O_{12}$ | 99.5:0.5 | $LiNi_{0.40}Co_{0.30}Mn_{0.30}O_2$ | 68.0 | 85.1 |
| Comparative Example 13 | $LiNi_{0.75}Mn_{0.25}O_2$ | $Li_4Ti_5O_{12}$ | 99.5:0.5 | $LiCoO_2$ | 68.0 | 83.2 |
| Comparative Example 14 | $LiNi_{0.75}Mn_{0.25}O_2$ | $Li_4Ti_5O_{12}$ | 60:40 | $LiNi_{0.40}Co_{0.30}Mn_{0.30}O_2$ | 89.2 | 60.6 |
| Comparative Example 15 | $LiNi_{0.75}Mn_{0.25}O_2$ | $Al_2O_3$ | 60:40 | $LiNi_{0.40}Co_{0.30}Mn_{0.30}O_2$ | 82.8 | 58.0 |
| Comparative Example 16 | $LiNi_{0.50}Co_{0.20}Mn_{0.30}O_2$ | $Li_4Ti_5O_{12}$ | 60:40 | $LiNi_{0.40}Co_{0.30}Mn_{0.30}O_2$ | 87.8 | 60.2 |
| Comparative Example 17 | $LiNi_{0.80}Mn_{0.20}O_2$ | $Li_4Ti_5O_{12}$ | 60:40 | $LiNi_{0.40}Co_{0.30}Mn_{0.30}O_2$ | 87.9 | 61.4 |
| Comparative Example 18 | $LiNi_{0.75}Mn_{0.25}O_2$ | $Li_4Ti_5O_{12}$ | 60:40 | $LiCoO_2$ | 88.7 | 59.4 |

The following can be understood from Table 3.

(1) When the weight ratio C/D between the first lithium transition metal composite oxide and the inorganic compound forming the cover layer is set in the range of 99/1 to 65/35, the cycle capacity retention ratio at a high temperature of 50° C. and the capacity retention ratio at large current discharge can be made 79.0% or more and 77.7% or more, respectively.

(2) According to the results of Examples 11, 12, 16, 17, 21, and 22 are compared to each other, when $Li_4Ti_5O_{12}$ is used as the inorganic compound, the cycle capacity retention ratio at a high temperature of 50° C. and the capacity retention ratio at large current discharge can be improved as compared to the case in which $Al_2O_3$ is used as the inorganic compound. That is, as the inorganic compound forming the cover layer, a composite oxide containing Li and Ti is preferably used.

Among the results of the examples and the comparative examples shown in Table 3, results obtained under the same manufacturing conditions except for the weight ratio C/D are shown in FIG. 3.

that in Example 1, thereby obtaining a non-aqueous electrolyte secondary cell. Next, as was Example 1, the cycle retention ratio at 50° C. and the retention ratio at large current discharge were measured.

TABLE 4

|  | First Lithium Transition Metal Composite Oxide | Inorganic Compound | Weight Ratio C:D | Second Lithium Transition Metal Composite Oxide | Capacity Retention Ratio at 50° C. (%) | Capacity Retention Ratio at Large Current Discharge (%) |
|---|---|---|---|---|---|---|
| Example 1 | $LiNi_{0.75}Mn_{0.25}O_2$ | $Li_4Ti_5O_{12}$ | 90:10 | $LiNi_{0.40}Co_{0.30}Mn_{0.30}O_2$ | 90.1 | 85.1 |
| Example 11 | $LiNi_{0.75}Mn_{0.25}O_2$ | $Li_4Ti_5O_{12}$ | 99:1 | $LiNi_{0.40}Co_{0.30}Mn_{0.30}O_2$ | 83.5 | 84.3 |
| Example 16 | $LiNi_{0.75}Mn_{0.25}O_2$ | $Li_4Ti_5O_{12}$ | 80:20 | $LiNi_{0.40}Co_{0.30}Mn_{0.30}O_2$ | 91.3 | 82.0 |
| Example 21 | $LiNi_{0.75}Mn_{0.25}O_2$ | $Li_4Ti_5O_{12}$ | 65:35 | $LiNi_{0.40}Co_{0.30}Mn_{0.30}O_2$ | 91.5 | 80.6 |
| Comparative Example 9 | $LiNi_{0.75}Mn_{0.25}O_2$ | $Li_4Ti_5O_{12}$ | 99.5:0.5 | $LiNi_{0.40}Co_{0.30}Mn_{0.30}O_2$ | 69.0 | 84.0 |
| Comparative Example 14 | $LiNi_{0.75}Mn_{0.25}O_2$ | $Li_4Ti_5O_{12}$ | 60:40 | $LiNi_{0.40}Co_{0.30}Mn_{0.30}O_2$ | 89.2 | 60.6 |

The following can be understood from Table 4. That is, when the ratio of the weight C is increased as compared to that of a weight ratio of 99/1, the cycle capacity retention ratio at a high temperature of 50° C. is extremely decreased, and when the ratio of the weight C is decreased as compared to that of a weight ratio of 65/35, the capacity retention ratio at large current discharge is extremely decreased. That is, when the weight ratio C/D is controlled in the range of 99/1 to 65/35, the cycle capacity retention ratio at a high temperature of 50° C. and the capacity retention ratio at large current discharge can be significantly improved.

Next, examples and comparative examples will be described which were performed for research on the average grain diameter of the positive electrode active material.

Example 26

Except that a first lithium transition metal composite oxide having an average grain diameter of 17 μm was formed by changing the synthetic conditions of the first lithium transition metal composite oxide, the first and the second composite oxides were obtained in the same manner as that in Example 1. Subsequently, the first and the second composite oxides were mixed together at a weight ratio of 50/50 in the same manner as that in Example 1, thereby forming the positive electrode active material. When measured using the same measurement method as that in Example 1, the average grain diameter of the positive electrode active material was 18 μm. The following steps were performed in the same manner as that in Example 1, thereby obtaining a non-aqueous electrolyte secondary cell. Next, as was Example 1, the cycle retention ratio at 50° C. and the retention ratio at large current discharge were measured.

Example 27

Except that a first lithium transition metal composite oxide having an average grain diameter of 17 μm was formed by changing the synthetic conditions of the first lithium transition metal composite oxide, the first and the second composite oxides were obtained in the same manner as that in Example 5. Subsequently, the first and the second composite oxides were mixed together at a weight ratio of 50/50 in the same manner as that in Example 1, thereby forming the positive electrode active material. When measured using the same measurement method as that in Example 1, the average grain diameter of the positive electrode active material was 19 μm. The following steps were performed in the same manner as that in Example 1, thereby obtaining a non-aqueous electrolyte secondary cell. Next, as was Example 1, the cycle retention ratio at 50° C. and the retention ratio at large current discharge were measured.

Example 28

Except that a first lithium transition metal composite oxide having an average grain diameter of 16 μm was formed by changing the synthetic conditions of the first lithium transition metal composite oxide, the first and the second composite oxides were obtained in the same manner as that in Example 8. Subsequently, the first and the second composite oxides were mixed together at a weight ratio of 50/50 in the same manner as that in Example 1, thereby forming the positive electrode active material. When measured using the same measurement method as that in Example 1, the average grain diameter of the positive electrode active material was 18 μm. The following steps were performed in the same manner as that in Example 1, thereby obtaining a non-aqueous electrolyte secondary cell. Next, as was Example 1, the cycle retention ratio at 50° C. and the retention ratio at large current discharge were measured.

Example 29

Except that a first lithium transition metal composite oxide having an average grain diameter of 17 μm was formed by changing the synthetic conditions of the first lithium transition metal composite oxide, the first and the second composite oxides were obtained in the same manner as that in Example 9. Subsequently, the first and the second composite oxides were mixed together at a weight ratio of 50/50 in the same manner as that in Example 1, thereby forming the positive electrode active material. When measured using the same measurement method as that in Example 1, the average grain diameter of the positive electrode active material was 18 μm. The following steps were performed in the same manner as that in Example 1, thereby obtaining a non-aqueous electrolyte secondary cell. Next, as was Example 1, the cycle retention ratio at 50° C. and the retention ratio at large current discharge were measured.

Example 30

Except that a first lithium transition metal composite oxide having an average grain diameter of 17 μm was formed by changing the synthetic conditions of the first lithium transition metal composite oxide, the first and the second composite oxides were obtained in the same manner as that in Example 10. Subsequently, the first and the second composite oxides were mixed together at a weight ratio of 50/50 in the same manner as that in Example 1, thereby forming the positive electrode active material. When measured using the same measurement method as that in Example 1, the average grain diameter of the positive electrode active material was 18 μm. The following steps were performed in the same manner as that in Example 1, thereby obtaining a non-aqueous electrolyte secondary cell. Next, as was Example 1, the cycle retention ratio at 50° C. and the retention ratio at large current discharge were measured.

Example 31

Except that a first lithium transition metal composite oxide having an average grain diameter of 7 μm was formed by changing the synthetic conditions of the first lithium transition metal composite oxide, the first and the second composite oxides were obtained in the same manner as that in Example 1. Subsequently, the first and the second composite oxides were mixed together at a weight ratio of 50/50 in the same manner as that in Example 1, thereby forming the positive electrode active material. When measured using the same measurement method as that in Example 1, the average grain diameter of the positive electrode active material was 9 μm. The following steps were performed in the same manner as that in Example 1, thereby obtaining a non-aqueous electrolyte secondary cell. Next, as was Example 1, the cycle retention ratio at 50° C. and the retention ratio at large current discharge were measured.

Example 32

Except that a first lithium transition metal composite oxide having an average grain diameter of 7 μm was formed by changing the synthetic conditions of the first lithium transition metal composite oxide, the first and the second composite oxides were obtained in the same manner as that in Example 5. Subsequently, the first and the second composite oxides were mixed together at a weight ratio of 50/50 in the same manner as that in Example 1, thereby forming the positive electrode active material. When measured using the same measurement method as that in Example 1, the average grain diameter of the positive electrode active material was 9 μm. The following steps were performed in the same manner as that in Example 1, thereby obtaining a non-aqueous electrolyte secondary cell. Next, as was Example 1, the cycle retention ratio at 50° C. and the retention ratio at large current discharge were measured.

Example 33

Except that a first lithium transition metal composite oxide having an average grain diameter of 7 μm was formed by changing the synthetic conditions of the first lithium transition metal composite oxide, the first and the second composite oxides were obtained in the same manner as that in Example 8. Subsequently, the first and the second composite oxides were mixed together at a weight ratio of 50/50 in the same manner as that in Example 1, thereby forming the positive electrode active material. When measured using the same measurement method as that in Example 1, the average grain diameter of the positive electrode active material was 9 μm. The following steps were performed in the same manner as that in Example 1, thereby obtaining a non-aqueous electrolyte secondary cell. Next, as was Example 1, the cycle retention ratio at 50° C. and the retention ratio at large current discharge were measured.

Example 34

Except that a first lithium transition metal composite oxide having an average grain diameter of 7 μm was formed by changing the synthetic conditions of the first lithium transition metal composite oxide, the first and the second composite oxides were obtained in the same manner as that in Example 9. Subsequently, the first and the second composite oxides were mixed together at a weight ratio of 50/50 in the same manner as that in Example 1, thereby forming the positive electrode active material. When measured using the same measurement method as that in Example 1, the average grain diameter of the positive electrode active material was 9 μm. The following steps were performed in the same manner as that in Example 1, thereby obtaining a non-aqueous electrolyte secondary cell. Next, as was Example 1, the cycle retention ratio at 50° C. and the retention ratio at large current discharge were measured.

Example 35

Except that a first lithium transition metal composite oxide having an average grain diameter of 7 μm was formed by changing the synthetic conditions of the first lithium transition metal composite oxide, the first and the second composite oxides were obtained in the same manner as that in Example 10. Subsequently, the first and the second composite oxides were mixed together at a weight ratio of 50/50 in the same manner as that in Example 1, thereby forming the positive electrode active material. When measured using the same measurement method as that in Example 1, the average grain diameter of the positive electrode active material was 10 μm. The following steps were performed in the same manner as that in Example 1, thereby obtaining a non-aqueous electrolyte secondary cell. Next, as was Example 1, the cycle retention ratio at 50° C. and the retention ratio at large current discharge were measured.

Example 36

Except that a first lithium transition metal composite oxide having an average grain diameter of 5 μm was formed by changing the synthetic conditions of the first lithium transition metal composite oxide, the first and the second composite oxides were obtained in the same manner as that in Example 1. Subsequently, the first and the second composite oxides were mixed together at a weight ratio of 50/50 in the same manner as that in Example 1, thereby forming the positive electrode active material. When measured using the same measurement method as that in Example 1, the average grain diameter of the positive electrode active material was 6 μm. The following steps were performed in the same manner as that in Example 1, thereby obtaining a non-aqueous electrolyte secondary cell. Next, as was Example 1, the cycle retention ratio at 50° C. and the retention ratio at large current discharge were measured.

Example 37

Except that a first lithium transition metal composite oxide having an average grain diameter of 5 μm was formed by changing the synthetic conditions of the first lithium transition metal composite oxide, the first and the second composite oxides were obtained in the same manner as that in Example 5. Subsequently, the first and the second composite oxides were mixed together at a weight ratio of 50/50 in the same manner as that in Example 1, thereby forming the posi-

Example 38

Except that a first lithium transition metal composite oxide having an average grain diameter of 5 μm was formed by changing the synthetic conditions of the first lithium transition metal composite oxide, the first and the second composite oxides were obtained in the same manner as that in Example 8. Subsequently, the first and the second composite oxides were mixed together at a weight ratio of 50/50 in the same manner as that in Example 1, thereby forming the positive electrode active material. When measured using the same measurement method as that in Example 1, the average grain diameter of the positive electrode active material was 6 μm. The following steps were performed in the same manner as that in Example 1, thereby obtaining a non-aqueous electrolyte secondary cell. Next, as was Example 1, the cycle retention ratio at 50° C. and the retention ratio at large current discharge were measured.

Example 39

Except that a first lithium transition metal composite oxide having an average grain diameter of 5 μm was formed by changing the synthetic conditions of the first lithium transition metal composite oxide, the first and the second composite oxides were obtained in the same manner as that in Example 9. Subsequently, the first and the second composite oxides were mixed together at a weight ratio of 50/50 in the same manner as that in Example 1, thereby forming the positive electrode active material. When measured using the same measurement method as that in Example 1, the average grain diameter of the positive electrode active material was 6 μm. The following steps were performed in the same manner as that in Example 1, thereby obtaining a non-aqueous electrolyte secondary cell. Next, as was Example 1, the cycle retention ratio at 50° C. and the retention ratio at large current discharge were measured.

Example 40

Except that a first lithium transition metal composite oxide having an average grain diameter of 5 μm was formed by changing the synthetic conditions of the first lithium transition metal composite oxide, the first and the second composite oxides were obtained in the same manner as that in Example 10. Subsequently, the first and the second composite oxides were mixed together at a weight ratio of 50/50 in the same manner as that in Example 1, thereby forming the positive electrode active material. When measured using the same measurement method as that in Example 1, the average grain diameter of the positive electrode active material was 6 μm. The following steps were performed in the same manner as that in Example 1, thereby obtaining a non-aqueous electrolyte secondary cell. Next, as was Example 1, the cycle retention ratio at 50° C. and the retention ratio at large current discharge were measured.

Comparative Example 19

Except that a first lithium transition metal composite oxide having an average grain diameter of 3 μm was formed by changing the synthetic conditions of the first lithium transition metal composite oxide, the first and the second composite oxides were obtained in the same manner as that in Example 1. Subsequently, the first and the second composite oxides were mixed together at a weight ratio of 50/50 in the same manner as that in Example 1, thereby forming the positive electrode active material. When measured using the same measurement method as that in Example 1, the average grain diameter of the positive electrode active material was 4 μm. The following steps were performed in the same manner as that in Example 1, thereby obtaining a non-aqueous electrolyte secondary cell. Next, as was Example 1, the cycle retention ratio at 50° C. and the retention ratio at large current discharge were measured.

Comparative Example 20

Except that a first lithium transition metal composite oxide having an average grain diameter of 3 μm was formed by changing the synthetic conditions of the first lithium transition metal composite oxide, the first and the second composite oxides were obtained in the same manner as that in Example 5. Subsequently, the first and the second composite oxides were mixed together at a weight ratio of 50/50 in the same manner as that in Example 1, thereby forming the positive electrode active material. When measured using the same measurement method as that in Example 1, the average grain diameter of the positive electrode active material was 4 μm. The following steps were performed in the same manner as that in Example 1, thereby obtaining a non-aqueous electrolyte secondary cell. Next, as was Example 1, the cycle retention ratio at 50° C. and the retention ratio at large current discharge were measured.

Comparative Example 21

Except that a first lithium transition metal composite oxide having an average grain diameter of 3 μm was formed by changing the synthetic conditions of the first lithium transition metal composite oxide, the first and the second composite oxides were obtained in the same manner as that in Example 8. Subsequently, the first and the second composite oxides were mixed together at a weight ratio of 50/50 in the same manner as that in Example 1, thereby forming the positive electrode active material. When measured using the same measurement method as that in Example 1, the average grain diameter of the positive electrode active material was 4 μm. The following steps were performed in the same manner as that in Example 1, thereby obtaining a non-aqueous electrolyte secondary cell. Next, as was Example 1, the cycle retention ratio at 50° C. and the retention ratio at large current discharge were measured.

Comparative Example 22

Except that a first lithium transition metal composite oxide having an average grain diameter of 3 μm was formed by changing the synthetic conditions of the first lithium transition metal composite oxide, the first and the second composite oxides were obtained in the same manner as that in Example 9. Subsequently, the first and the second composite oxides were mixed together at a weight ratio of 50/50 in the same manner as that in Example 1, thereby forming the positive electrode active material. When measured using the same measurement method as that in Example 1, the average grain diameter of the positive electrode active material was 4 μm. The following steps were performed in the same manner as that in Example 1, thereby obtaining a non-aqueous electrolyte secondary cell. Next, as was Example 1, the cycle retention ratio at 50° C. and the retention ratio at large current discharge were measured.

Comparative Example 23

Except that a first lithium transition metal composite oxide having an average grain diameter of 3 μm was formed by changing the synthetic conditions of the first lithium transition metal composite oxide, the first and the second composite oxides were obtained in the same manner as that in Example 10. Subsequently, the first and the second composite oxides were mixed together at a weight ratio of 50/50 in the same manner as that in Example 1, thereby forming the positive electrode active material. When measured using the same measurement method as that in Example 1, the average grain diameter of the positive electrode active material was 4 μm. The following steps were performed in the same manner as that in Example 1, thereby obtaining a non-aqueous electrolyte secondary cell. Next, as was Example 1, the cycle retention ratio at 50° C. and the retention ratio at large current discharge were measured.

Comparative Example 24

Except that a first lithium transition metal composite oxide having an average grain diameter of 23 μm was formed by changing the synthetic conditions of the first lithium transition metal composite oxide, the first and the second composite oxides were obtained in the same manner as that in Example 1. Subsequently, the first and the second composite oxides were mixed together at a weight ratio of 50/50 in the same manner as that in Example 1, thereby forming the positive electrode active material. When measured using the same measurement method as that in Example 1, the average grain diameter of the positive electrode active material was 24 μm. The following steps were performed in the same manner as that in Example 1, thereby obtaining a non-aqueous electrolyte secondary cell. Next, as was Example 1, the cycle retention ratio at 50° C. and the retention ratio at large current discharge were measured.

Comparative Example 25

Except that a first lithium transition metal composite oxide having an average grain diameter of 22 μm was formed by changing the synthetic conditions of the first lithium transition metal composite oxide, the first and the second composite oxides were obtained in the same manner as that in Example 5. Subsequently, the first and the second composite oxides were mixed together at a weight ratio of 50/50 in the same manner as that in Example 1, thereby forming the positive electrode active material. When measured using the same measurement method as that in Example 1, the average grain diameter of the positive electrode active material was 25 μm. The following steps were performed in the same manner as that in Example 1, thereby obtaining a non-aqueous electrolyte secondary cell. Next, as was Example 1, the cycle retention ratio at 50° C. and the retention ratio at large current discharge were measured.

Comparative Example 26

Except that a first lithium transition metal composite oxide having an average grain diameter of 23 μm was formed by changing the synthetic conditions of the first lithium transition metal composite oxide, the first and the second composite oxides were obtained in the same manner as that in Example 8. Subsequently, the first and the second composite oxides were mixed together at a weight ratio of 50/50 in the same manner as that in Example 1, thereby forming the positive electrode active material. When measured using the same measurement method as that in Example 1, the average grain diameter of the positive electrode active material was 25 μm. The following steps were performed in the same manner as that in Example 1, thereby obtaining a non-aqueous electrolyte secondary cell. Next, as was Example 1, the cycle retention ratio at 50° C. and the retention ratio at large current discharge were measured.

Comparative Example 27

Except that a first lithium transition metal composite oxide having an average grain diameter of 23 μm was formed by changing the synthetic conditions of the first lithium transition metal composite oxide, the first and the second composite oxides were obtained in the same manner as that in Example 9. Subsequently, the first and the second composite oxides were mixed together at a weight ratio of 50/50 in the same manner as that in Example 1, thereby forming the positive electrode active material. When measured using the same measurement method as that in Example 1, the average grain diameter of the positive electrode active material was 25 μm. The following steps were performed in the same manner as that in Example 1, thereby obtaining a non-aqueous electrolyte secondary cell. Next, as was Example 1, the cycle retention ratio at 50° C. and the retention ratio at large current discharge were measured.

Comparative Example 28

Except that a first lithium transition metal composite oxide having an average grain diameter of 23 μm was formed by changing the synthetic conditions of the first lithium transition metal composite oxide, the first and the second composite oxides were obtained in the same manner as that in Example 10. Subsequently, the first and the second composite oxides were mixed together at a weight ratio of 50/50 in the same manner as that in Example 1, thereby forming the positive electrode active material. When measured using the same measurement method as that in Example 1, the average grain diameter of the positive electrode active material was 25 μm. The following steps were performed in the same manner as that in Example 1, thereby obtaining a non-aqueous electrolyte secondary cell. Next, as was Example 1, the cycle retention ratio at 50° C. and the retention ratio at large current discharge were measured.

Table 5 shows the structures and the evaluation results of the non-aqueous electrolyte secondary cells according to Examples 26 to 40 and Comparative Examples 19 to 28.

TABLE 5

| | First Lithium Transition Metal Composite Oxide | Inorganic Compound | Second Lithium Transition Metal Composite Oxide | Average Grain Diameter of Positive Electrode Active Material (μm) | Capacity Retention Ratio at 50° C. (%) | Capacity Retention Ratio at Large Current Discharge (%) |
|---|---|---|---|---|---|---|
| Example 1 | $LiNi_{0.75}Mn_{0.25}O_2$ | $Li_4Ti_5O_{12}$ | $LiNi_{0.40}Co_{0.30}Mn_{0.30}O_2$ | 14 | 90.1 | 85.1 |
| Example 26 | $LiNi_{0.75}Mn_{0.25}O_2$ | $Li_4Ti_5O_{12}$ | $LiNi_{0.40}Co_{0.30}Mn_{0.30}O_2$ | 18 | 91.1 | 80.0 |
| Example 27 | $LiNi_{0.75}Mn_{0.25}O_2$ | $Al_2O_3$ | $LiNi_{0.40}Co_{0.30}Mn_{0.30}O_2$ | 19 | 84.2 | 78.4 |
| Example 28 | $LiNi_{0.50}Co_{0.20}Mn_{0.30}O_2$ | $Li_4Ti_5O_{12}$ | $LiNi_{0.40}Co_{0.30}Mn_{0.30}O_2$ | 18 | 90.0 | 80.4 |
| Example 29 | $LiNi_{0.80}Mn_{0.20}O_2$ | $Li_4Ti_5O_{12}$ | $LiNi_{0.40}Co_{0.30}Mn_{0.30}O_2$ | 18 | 89.8 | 81.0 |
| Example 30 | $LiNi_{0.75}Mn_{0.25}O_2$ | $Li_4Ti_5O_{12}$ | $LiCoO_2$ | 18 | 90.6 | 79.4 |
| Example 31 | $LiNi_{0.75}Mn_{0.25}O_2$ | $Li_4Ti_5O_{12}$ | $LiNi_{0.40}Co_{0.30}Mn_{0.30}O_2$ | 9 | 85.9 | 86.8 |
| Example 32 | $LiNi_{0.75}Mn_{0.25}O_2$ | $Al_2O_3$ | $LiNi_{0.40}Co_{0.30}Mn_{0.30}O_2$ | 9 | 78.4 | 83.7 |
| Example 33 | $LiNi_{0.50}Co_{0.20}Mn_{0.30}O_2$ | $Li_4Ti_5O_{12}$ | $LiNi_{0.40}Co_{0.30}Mn_{0.30}O_2$ | 9 | 85.5 | 86.2 |
| Example 34 | $LiNi_{0.80}Mn_{0.20}O_2$ | $Li_4Ti_5O_{12}$ | $LiNi_{0.40}Co_{0.30}Mn_{0.30}O_2$ | 9 | 84.7 | 87.9 |
| Example 35 | $LiNi_{0.75}Mn_{0.25}O_2$ | $Li_4Ti_5O_{12}$ | $LiCoO_2$ | 10 | 85.2 | 86.2 |
| Example 36 | $LiNi_{0.75}Mn_{0.25}O_2$ | $Li_4Ti_5O_{12}$ | $LiNi_{0.40}Co_{0.30}Mn_{0.30}O_2$ | 6 | 79.3 | 85.8 |
| Example 37 | $LiNi_{0.75}Mn_{0.25}O_2$ | $Al_2O_3$ | $LiNi_{0.40}Co_{0.30}Mn_{0.30}O_2$ | 6 | 75.1 | 82.9 |
| Example 38 | $LiNi_{0.50}Co_{0.20}Mn_{0.30}O_2$ | $Li_4Ti_5O_{12}$ | $LiNi_{0.40}Co_{0.30}Mn_{0.30}O_2$ | 6 | 78.9 | 85.2 |
| Example 39 | $LiNi_{0.80}Mn_{0.20}O_2$ | $Li_4Ti_5O_{12}$ | $LiNi_{0.40}Co_{0.30}Mn_{0.30}O_2$ | 6 | 78.1 | 86.9 |
| Example 40 | $LiNi_{0.75}Mn_{0.25}O_2$ | $Li_4Ti_5O_{12}$ | $LiCoO_2$ | 6 | 78.3 | 82.1 |
| Comparative Example 19 | $LiNi_{0.75}Mn_{0.25}O_2$ | $Li_4Ti_5O_{12}$ | $LiNi_{0.40}Co_{0.30}Mn_{0.30}O_2$ | 4 | 62.3 | 76.4 |
| Comparative Example 20 | $LiNi_{0.75}Mn_{0.25}O_2$ | $Al_2O_3$ | $LiNi_{0.40}Co_{0.30}Mn_{0.30}O_2$ | 4 | 55.7 | 74.9 |
| Comparative Example 21 | $LiNi_{0.50}Co_{0.20}Mn_{0.30}O_2$ | $Li_4Ti_5O_{12}$ | $LiNi_{0.40}Co_{0.30}Mn_{0.30}O_2$ | 4 | 61.1 | 75.6 |
| Comparative Example 22 | $LiNi_{0.80}Mn_{0.20}O_2$ | $Li_4Ti_5O_{12}$ | $LiNi_{0.40}Co_{0.30}Mn_{0.30}O_2$ | 4 | 61.4 | 77.3 |
| Comparative Example 23 | $LiNi_{0.75}Mn_{0.25}O_2$ | $Li_4Ti_5O_{12}$ | $LiCoO_2$ | 4 | 60.9 | 74.3 |
| Comparative Example 24 | $LiNi_{0.75}Mn_{0.25}O_2$ | $Li_4Ti_5O_{12}$ | $LiNi_{0.40}Co_{0.30}Mn_{0.30}O_2$ | 24 | 77.7 | 51.6 |
| Comparative Example 25 | $LiNi_{0.75}Mn_{0.25}O_2$ | $Al_2O_3$ | $LiNi_{0.40}Co_{0.30}Mn_{0.30}O_2$ | 25 | 69.9 | 50.3 |
| Comparative Example 26 | $LiNi_{0.50}Co_{0.20}Mn_{0.30}O_2$ | $Li_4Ti_5O_{12}$ | $LiNi_{0.40}Co_{0.30}Mn_{0.30}O_2$ | 25 | 77.0 | 51.2 |
| Comparative Example 27 | $LiNi_{0.80}Mn_{0.20}O_2$ | $Li_4Ti_5O_{12}$ | $LiNi_{0.40}Co_{0.30}Mn_{0.30}O_2$ | 25 | 76.6 | 52.3 |
| Comparative Example 28 | $LiNi_{0.75}Mn_{0.25}O_2$ | $Li_4Ti_5O_{12}$ | $LiCoO_2$ | 25 | 78.2 | 51.0 |

The following can be understood from Table 5.

(1) When the average grain diameter is controlled in the range of 5 to 20 μm, the cycle capacity retention ratio at a high temperature of 50° C. and the capacity retention ratio at large current discharge cane be made 75.1% or more and 78.4% or more, respectively.

(2) According to the results of Examples 31, 32, 36, and 37, compared to the case in which $Al_2O_3$ is used as the inorganic compound for forming the cover layer, when $Li_4Ti_5O_{12}$ is used, the cycle capacity retention ratio at a high temperature of 50° C. and the capacity retention ratio at large current discharge can be improved. That is, a composite oxide containing Li and Ti is preferably used as the inorganic compound.

Among the results of the examples and the comparative examples shown in Table 5, results obtained under the same manufacturing conditions except for the average grain diameter are shown in Table 6.

TABLE 6

| | First Lithium Transition Metal Composite Oxide | Inorganic Compound | Second Lithium Transition Metal Composite Oxide | Average Grain Diameter of Positive Electrode Active Material (μm) | Capacity Retention Ratio at 50° C. (%) | Capacity Retention Ratio at Large Current Discharge (%) |
|---|---|---|---|---|---|---|
| Example 1 | $LiNi_{0.75}Mn_{0.25}O_2$ | $Li_4Ti_5O_{12}$ | $LiNi_{0.40}Co_{0.30}Mn_{0.30}O_2$ | 14 | 90.1 | 85.1 |
| Example 26 | $LiNi_{0.75}Mn_{0.25}O_2$ | $Li_4Ti_5O_{12}$ | $LiNi_{0.40}Co_{0.30}Mn_{0.30}O_2$ | 18 | 91.1 | 80.0 |
| Example 31 | $LiNi_{0.75}Mn_{0.25}O_2$ | $Li_4Ti_5O_{12}$ | $LiNi_{0.40}Co_{0.30}Mn_{0.30}O_2$ | 9 | 85.9 | 86.8 |
| Example 36 | $LiNi_{0.75}Mn_{0.25}O_2$ | $Li_4Ti_5O_{12}$ | $LiNi_{0.40}Co_{0.30}Mn_{0.30}O_2$ | 6 | 79.3 | 85.8 |
| Comparative Example 19 | $LiNi_{0.75}Mn_{0.25}O_2$ | $Li_4Ti_5O_{12}$ | $LiNi_{0.40}Co_{0.30}Mn_{0.30}O_2$ | 4 | 62.3 | 76.4 |
| Comparative Example 24 | $LiNi_{0.75}Mn_{0.25}O_2$ | $Li_4Ti_5O_{12}$ | $LiNi_{0.40}Co_{0.30}Mn_{0.30}O_2$ | 24 | 77.7 | 51.6 |

According to the results shown in Table 6, when the average grain diameter is less than 5 μm, the cycle capacity retention ratio at a high temperature of 50° C. is extremely decreased, and when the average grain diameter is more than 20 μm, the capacity retention ratio at large current discharge is extremely decreased. That is, when the average grain diameter is controlled in the range of 5 to 20 μm, the cycle capacity retention ratio at a high temperature of 50° C. and the capacity retention ratio at large current discharge can be significantly improved.

Heretofore, an embodiment of the present invention has been described in detail; however, the present invention is not limited to the above embodiment and may be variously modified without departing from the spirit and the scope of the present invention.

For example, the values described in the above embodiment are shown by way of example, and whenever necessary, different values may also be used.

In addition, in the above embodiment, the present invention is applied to a non-aqueous electrolyte secondary cell using a non-aqueous electrolytic solution as an electrolyte by way of example, and in addition, the present invention may also be applied to a non-aqueous electrolyte secondary cell using a solid electrolyte or a gel electrolyte.

As the solid electrolyte, when having lithium ion conductivity, both an inorganic solid electrolyte and a high molecular solid electrolyte may be used. As the inorganic solid electrolyte, for example, lithium nitride or lithium iodide may be mentioned. The high molecular solid electrolyte is composed of a high molecular compound and an electrolyte salt dissolved therein. As the high molecular compound described above, for example, an ether-based high molecular compound, such as poly(ethylene oxide) or a compound formed therefrom by crosslinking, a poly(methacrylate)ester compound, and an acrylate compound may be used alone or in combination, or a copolymer may also be used which is formed by using at least one of the aforementioned materials as a constituent element thereof.

As a matrix of the gel electrolyte, when being capable of absorbing and gelating a non-aqueous electrolyte, various high molecular materials may be used, and for example, fluorine-containing high molecular materials such as poly(vinyliden fluoride) and poly(vinylidene fluoride-co-hexafluoropropylene), ether-based high molecular compounds, such as poly(ethylene oxide) and a compound formed therefrom by crosslinking, and poly(acrylonitrile) may be used. In particular, in view of oxidation and reduction stability, fluorine-containing high molecular materials are preferably used. By addling an electrolyte salt to the matrix described above, ionic conductivity can be obtained.

As the electrolyte salt used in the electrolyte described above, any materials which are used for this type of cell may be used. For example, there may be mentioned $LiClO_4$, $LiAsF_6$, $LiPF_6$, $LiBF_4$, $LiB(C_6H_5)_4$, $LiCH_3SO_3$, $LiCF_3SO_3$, LiCl, and LiBr.

In addition, in the embodiment described above, the present invention is applied to a cell having a cylindrical shape by way of example; however, the present invention may also be applied to a cell having a shape other than cylinder. For example, the present invention may be applied to cells having various shapes such as a square, coin, bottom, and laminate seal.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A positive electrode active material comprising: a first composite oxide; and a second composite oxide,
   the first composite oxide comprising:
       grains of a first lithium transition metal composite oxide containing at least nickel as a transition metal; and
       a cover layer formed on at least part of a surface of each of the grains of the first lithium transition metal composite oxide for suppressing decomposition of an electrolyte caused by the first lithium transition metal composite oxide,
   the second composite oxide comprising:
       grains of a second lithium transition metal composite oxide,
   wherein the second composite oxide is mixed with the first composite oxide after the cover layer is formed on the grains of the first lithium transitional metal composite oxide.

2. The positive electrode active material according to claim 1, wherein the transition metal contains about 50% or more of nickel on a molar basis.

3. The positive electrode active material according to claim 1, wherein the ratio of the first composite oxide to the second composite oxide on a weight basis ranges from about 80:20 to about 30:70.

4. The positive electrode active material according to claim 1, wherein the first composite oxide and the second composite oxide form a mixture having an average grain diameter ranging from about 5 μm to about 20 μm.

5. The positive electrode active material according to claim 1, wherein the cover layer comprises an inorganic compound.

6. The positive electrode active material according to claim 5, wherein the ratio of the first lithium transition metal composite oxide to the inorganic compound on a weight basis ranges from about 99:1 to about 65:35.

7. The positive electrode active material according to claim 5, wherein the inorganic compound comprises lithium.

8. A non-aqueous electrolyte secondary cell comprising:
   an electrolyte; and
   a positive electrode active material which contains a first composite oxide and a second composite oxide,
   the first composite oxide comprising:
       grains of a first lithium transition metal composite oxide containing at least nickel as a transition metal; and
       a cover layer formed on at least part of the surface of each of the grains of the first lithium transition metal composite oxide for suppressing decomposition of the electrolyte caused by the first lithium transition metal composite oxide,
   the second composite oxide comprising:
       grains of a second lithium transition metal composite oxide,
   wherein the second composite oxide is mixed with the first composite oxide after the cover layer is formed on the grains of the first lithium transitional metal composite oxide.

9. The non-aqueous electrolyte secondary cell according to claim 8, wherein the transition metal contains about 50% or more of nickel on a molar basis.

10. The non-aqueous electrolyte secondary cell according to claim 8, wherein the ratio of the first composite oxide to the second composite oxide on a weight basis ranges from about 80:20 to about 30:70.

11. The non-aqueous electrolyte secondary cell according to claim 8, wherein the first composite oxide and the second composite oxide form a mixture having an average grain diameter ranging from about 5 μm to about 20 μm.

12. The non-aqueous electrolyte secondary cell according to claim 8, wherein the cover layer comprises an inorganic compound.

13. The non-aqueous electrolyte secondary cell according to claim 12, wherein the ratio of the first lithium transition metal composite oxide to the inorganic compound on a weight basis ranges from about 99:1 to about 65:35.

14. The non-aqueous electrolyte secondary cell according to claim 12, wherein the inorganic compound comprises lithium.

\* \* \* \* \*